US012236705B1

(12) United States Patent
Ulutan et al.

(10) Patent No.: US 12,236,705 B1
(45) Date of Patent: Feb. 25, 2025

(54) PEDESTRIAN ATTRIBUTE AND GESTURE DETECTION

(71) Applicant: Zoox, Inc., Foster City, CA (US)

(72) Inventors: Oytun Ulutan, Buena Park, CA (US); Xin Wang, Sunnyvale, CA (US); Kratarth Goel, Albany, CA (US); Vasiliy Karasev, San Francisco, CA (US); Sarah Tariq, Palo Alto, CA (US); Yi Xu, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 585 days.

(21) Appl. No.: 17/320,678

(22) Filed: May 14, 2021

Related U.S. Application Data

(60) Provisional application No. 63/117,263, filed on Nov. 23, 2020, provisional application No. 62/028,377, filed on May 21, 2020.

(51) Int. Cl.
| | |
|---|---|
| *G06K 9/00* | (2022.01) |
| *G01S 13/89* | (2006.01) |
| *G01S 17/89* | (2020.01) |
| *G05D 1/00* | (2006.01) |
| *G06N 5/04* | (2023.01) |

(Continued)

(52) U.S. Cl.
CPC ............ *G06V 40/107* (2022.01); *G01S 13/89* (2013.01); *G01S 17/89* (2013.01); *G05D 1/0276* (2013.01); *G06N 5/04* (2013.01); *G06N 20/00* (2019.01); *G06V 10/22* (2022.01); *G06V 20/56* (2022.01)

(58) Field of Classification Search
CPC ...... G06V 40/107; G06V 10/22; G06V 20/56; G01S 13/89; G01S 17/89; G05D 1/0276; G05D 2201/0213; G06N 5/04; G06N 20/00
See application file for complete search history.

(56) References Cited

U.S. PATENT DOCUMENTS

| | | |
|---|---|---|
| 10,967,824 B1 | 4/2021 | Pertsel |
| 11,048,927 B2 | 6/2021 | Russell |

(Continued)

FOREIGN PATENT DOCUMENTS

| | | | | |
|---|---|---|---|---|
| CN | 110858295 A | * | 3/2020 | ......... G06K 9/00355 |
| CN | 113453970 | | 9/2021 | |

OTHER PUBLICATIONS

Office Action for U.S. Appl. No. 17/320,690, mailed on Jul. 27, 2023, Xin Wang, "Vehicle Door State Detection", 42 pages.

(Continued)

*Primary Examiner* — Xin Jia
(74) *Attorney, Agent, or Firm* — Lee & Hayes, P.C.

(57) ABSTRACT

Techniques for detecting attributes and/or gestures associated with pedestrians in an environment are described herein. The techniques may include receiving sensor data associated with a pedestrian in an environment of a vehicle and inputting the sensor data into a machine-learned model that is configured to determine a gesture and/or an attribute of the pedestrian. Based on the input data, an output may be received from the machine-learned model that indicates the gesture and/or the attribute of the pedestrian and the vehicle may be controlled based at least in part on the gesture and/or the attribute of the pedestrian. The techniques may also include training the machine-learned model to detect the attribute and/or the gesture of the pedestrian.

20 Claims, 10 Drawing Sheets

(51) Int. Cl.
  *G06N 20/00* (2019.01)
  *G06V 10/22* (2022.01)
  *G06V 20/56* (2022.01)
  *G06V 40/10* (2022.01)

(56) References Cited

U.S. PATENT DOCUMENTS

| | | |
|---|---|---|
| 11,074,438 B2 | 7/2021 | Mangalam |
| 11,138,446 B2 | 10/2021 | Kim |
| 11,167,756 B2 | 11/2021 | Shalev-Shwartz |
| 11,226,626 B1 | 1/2022 | Silver |
| 11,420,855 B2 | 8/2022 | Ishizaki |
| 11,427,195 B1 | 8/2022 | Pertsel et al. |
| 2010/0191391 A1 | 7/2010 | Zeng |
| 2016/0144867 A1 | 5/2016 | Delp |
| 2017/0074000 A1 | 3/2017 | Banvait |
| 2017/0206464 A1 | 7/2017 | Clayton et al. |
| 2019/0049987 A1 | 2/2019 | Djuric et al. |
| 2019/0359208 A1 | 11/2019 | Sapp |
| 2019/0384303 A1 | 12/2019 | Muller et al. |
| 2020/0026286 A1 | 1/2020 | Vozar et al. |
| 2020/0079371 A1 | 3/2020 | Sakamoto et al. |
| 2020/0110175 A1 | 4/2020 | Chen |
| 2020/0160537 A1 | 5/2020 | Urtasun et al. |
| 2020/0202209 A1 | 6/2020 | Mao |
| 2020/0210721 A1 | 7/2020 | Goel |
| 2020/0250553 A1 | 8/2020 | Tomaru |
| 2020/0293064 A1 | 9/2020 | Wu et al. |
| 2020/0307562 A1 | 10/2020 | Ghafarianzadeh et al. |
| 2020/0307563 A1 | 10/2020 | Ghafarianzadeh et al. |
| 2020/0357174 A1* | 11/2020 | Banerjee ............ G06F 3/011 |
| 2021/0094577 A1* | 4/2021 | Shalev-Shwartz ............ B60W 30/0953 |
| 2021/0245744 A1 | 8/2021 | Mangalam |
| 2021/0271866 A1 | 9/2021 | Hayakawa |
| 2021/0304514 A1 | 9/2021 | Croxford et al. |
| 2022/0027642 A1 | 1/2022 | Shambik et al. |
| 2022/0066456 A1 | 3/2022 | Ebrahimi Afrouzi et al. |
| 2022/0171065 A1 | 6/2022 | Li et al. |

OTHER PUBLICATIONS

Office Action for U.S. Appl. No. 17/320,690, mailed on Aug. 3, 2022, Ultan, "Machine-Learned Model Training for Pedestrian Attribute and Gesture Detection", 26 pages.
Office Action for U.S. Appl. No. 17/246,016, mailed on Nov. 30, 2023, Kratarth Goel, "Key Point Detection", 11 pages.
Office Action for U.S. Appl. No. 17/320,630, mailed on Dec. 19, 2023, Xin Wang, "Vehicle Door State Detection", 52 pages.
Office Action for U.S. Appl. No. 18/205,651, mailed on Jan. 5, 2024, Oytun Ulutan, "Machine-Learned Model Training for Pedestrian Attribute and Gesture Detection", 20 pages.
Office Action for U.S. Appl. No. 17/320,630, mailed on Jun. 4, 2024, Wang, "Vehicle Door State Detection", 44 pages.

* cited by examiner

PEDESTRIAN ATTRIBUTE AND GESTURE DETECTION

PRIORITY

This application claims priority to U.S. Provisional Application No. 63/028,377, filed May 21, 2020, which is incorporated herein by reference in its entirety and for all purposes. Additionally, this application claims priority to U.S. Provisional Application No. 63/117,263, filed Nov. 23, 2020, which is incorporated herein by reference in its entirety and for all purposes.

BACKGROUND

Computer vision is used in applications such as autonomous vehicle operation, identifying individuals for security purposes, and performing manufacturing and industrial tasks, etc. Computer vision techniques may use sensors to capture data of an environment and use this sensor data to detect and identify objects in the environment. Such techniques may utilize processors and associated memories, including various models, algorithms, and/or machine-learning algorithms to perform object detection and identification.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
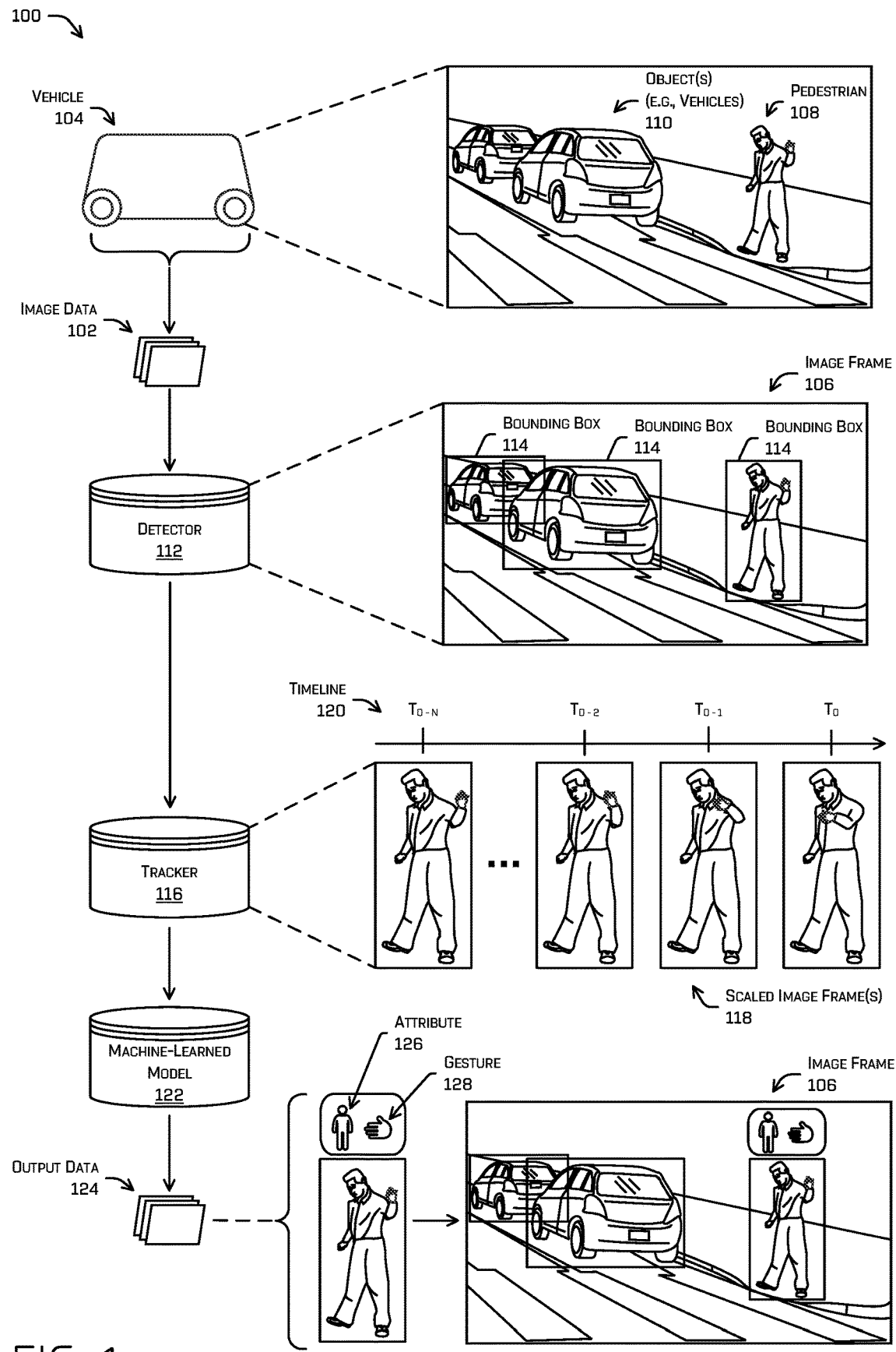
FIG. 1 is a pictorial flow diagram illustrating an example data flow that is associated with detecting attributes and/or gestures of pedestrians based on image data captured by a vehicle.

Techniques for detecting pedestrian attributes and/or gestures are described herein. As discussed above, computer vision is used in applications such as autonomous vehicle operation, identifying individuals for security purposes, and performing manufacturing and industrial tasks, etc. Computer vision techniques may use sensors to capture data of an environment and use this sensor data to detect and identify objects in the environment. Such techniques may utilize processors and associated memories, including various models, algorithms, and/or machine-learning algorithms to perform object detection and identification. For instance, machine-learned models may be trained to identify and predict characteristics of an object detected in a physical environment based on sensor data.

However, in some cases these machine-learned models may struggle to detect certain information that is necessary to make informed decisions in a high-risk environment. Take, for example, operating an autonomous vehicle in an environment in which pedestrians are present. The autonomous vehicle may rely on one or more machine-learned model(s) in order to traverse the environment safely. However, if the machine-learned model(s) is/are not trained to detect additional, contextual information associated with pedestrians in the environment, the risk that the autonomous vehicle may make an uninformed and potentially unsafe decision may be increased.

For example, scenarios may arise in which a pedestrian might wish to communicate their intentions to a vehicle using a hand gesture, especially in instances of indecision on behalf of either the pedestrian or the vehicle, or both. For instance, the pedestrian may wave to the vehicle to communicate that the pedestrian will wait to cross the street until after the vehicle has passed. Alternatively, the pedestrian may lift their hand to communicate that the pedestrian is going to cross the street before the vehicle, and that the vehicle should yield and stop for the pedestrian until the pedestrian is clear of the street.

Accordingly, this disclosure describes various techniques for detecting pedestrian attributes and/or gestures using machine-learned models and, based at least in part on the detected attributes and/or gestures, controlling the operation of a vehicle (e.g., cause the vehicle to accelerate, decelerate, stop, turn, veer, change trajectory, etc.). For instance, sensor data captured by the vehicle may be input into a machine learned model that is configured to detect an attribute of a pedestrian and/or a gesture of the pedestrian. In some examples, an attribute may indicate a classification of the pedestrian (e.g., construction worker, first responder, child, adult, etc.), an activity the pedestrian is engaged in (e.g., directing traffic, holding traffic sign, looking at phone, riding a bike, lifting an object, etc.), a pose of the pedestrian (e.g., standing, sitting, crouching, walking, running, etc.), and the like. Additionally, in some examples a gesture of the pedestrian may indicate a message the pedestrian is communicating with the vehicle (e.g., waving the vehicle by, holding hand up to stop the vehicle, telling the vehicle to change trajectory, etc.).

Among other things, the techniques described in this disclosure can improve the operation of autonomous vehicles by accurately detecting attributes and/or gestures of pedestrians so that the vehicle may traverse an environment more safely. For instance, the described techniques may be used to determine whether a pedestrian is communicating that they are going to cross a street in front of (e.g., before) a vehicle or, alternatively, behind (e.g., after) the vehicle. By being able to detect the pedestrian communicating their intentions/desire for the vehicle, the safety of the pedestrian can be improved. Additionally, the described techniques may be used to determine attributes of a pedestrian, and these attributes may also be used in determining gestures or confidence scores associated with the gestures.

By way of example, and not limitation, a method according to the various techniques disclosed herein may include receiving sensor data associated with a pedestrian in an environment of a vehicle. In some examples, the sensor data may include image data, lidar data, radar data, and/or the like. Additionally, or alternatively, the sensor data may include key point data associated with the pedestrian, as described in U.S. patent application Ser. No. 17/246,016, which is incorporated herein by reference in its entirety and for all purposes. In some instances, the sensor data may have been captured by a sensor system of the vehicle, and the sensor data may comprise raw sensor data or processed sensor data. In at least one example, the sensor data may include first sensor data that was captured by the vehicle at a first time, second sensor data that was captured by the vehicle at a second time after the first time, third sensor data that was captured by the vehicle at a third time after the second time, and so forth.

In some examples, the method may include inputting the sensor data into a machine-learned model that is configured to determine at least one of a gesture of the pedestrian or an attribute of the pedestrian based at least in part on input data. That is, the machine-learned model may be configured to receive sensor data as an input and determine a gesture or an attribute of the pedestrian using the sensor data. In at least one example, the first sensor data is input into the machine-learned model at the first time, the second sensor data is input into the machine-learned model at the second time, the third input data is input into the machine-learned model at the third time, and so forth. Additionally, the machine-learned model may cache outputs based on the first sensor data, the second sensor data, the third sensor data, and so forth for a period of time to determine the attributes and/or gestures over time.

In some instances, the method may include receiving, from the machine-learned model, an output indicating at least one of the gesture of the pedestrian or the attribute of the pedestrian. In at least one example, the output may indicate the gesture of the pedestrian, and the gesture may comprise a hand signal indicating that the vehicle is to yield to the pedestrian and controlling the vehicle may include causing the vehicle to yield to the pedestrian. For instance, the pedestrian may hold their hand up to signal to the vehicle to stop while pedestrian crosses a road. Additionally, or alternatively, the gesture of the pedestrian may be a hand signal indicating that the vehicle is to proceed along a trajectory prior to the pedestrian crossing the trajectory. For instance, the pedestrian may "wave" the vehicle by before the pedestrian crosses the road.

In some examples, detected gestures may additionally or alternatively be used to determine things other than an action of the pedestrian, future location of the pedestrian, and/or an action of the vehicle. For instance, a pedestrian may make a gesture to indicate that an object (e.g., pedestrian, animal, traffic cone, waste, foliage, etc.) is obstructing a path the vehicle is following, and this gesture may be detected and used to alter a trajectory of the vehicle to stop for the object, veer away from the object, and the like. As another example, pedestrians may make gestures to indicate abnormal conditions associated with the vehicle (e.g., vehicle door is open, fuel door is open and/or fuel cap is not secured, vehicle lights are off, cargo is not secured, and the like), and these gestures may also be detected to alert the vehicle of the abnormal condition.

In some examples, the output may include one or more attribute(s) of the pedestrian. The attribute(s) may indicate one or more of a classification of the pedestrian (e.g., construction worker, first responder, child, adult, etc.), an activity the pedestrian is engaged in (e.g., directing traffic, holding traffic sign, looking at phone, riding a bike, lifting an object, etc.), a pose of the pedestrian (e.g., standing, sitting, crouching, walking, running, etc.), and the like.

In some examples, the machine-learned model may further be configured to determine whether the pedestrian is holding a traffic sign (e.g., stop sign, slow sign, etc.). As such, the output received from the machine-learned model may, in some examples, further include an indication of a traffic sign proximate the pedestrian. The traffic sign may indicate a traffic rule associated with a path the vehicle is following through the environment. Accordingly, the vehicle may further be controlled based at least in part on the traffic sign. In some examples, an orientation of the traffic sign may be determined by the machine-learned model and/or based on the output of the machine-learned model. For instance, whether the sign is upright, upside down, facing left, facing right, quartered left, quartered right, etc. may be determined. The orientation of the traffic sign may be used to determine whether the traffic rule associated with the traffic sign applies to a path that the vehicle is traversing. For instance, the machine-learned model may detect that the traffic sign is upside down, and this may be used to determine that the traffic rule does not apply to a path driven by the vehicle. As another example, the machine-learned model may detect that the traffic sign is facing left or quartered left (e.g., a normal axis corresponding to a flat surface of the sign is not facing toward the vehicle), and this may be used to determine that the traffic rule applies to another path that the vehicle is not traversing (e.g., another lane of the road, an intersecting road, and/or the like).

In some examples, the method may include controlling the vehicle based at least in part on the output (e.g., the attribute(s) and/or the gesture). For instance, a predicted action of the pedestrian may be determined based at least in part on the output, and the vehicle may be controlled based at least in part on the predicted action.

In at least one example, a classification of a pedestrian may influence how a detected gesture of the pedestrian is treated. For instance, the output from the machine-learned model may include an indication of an attribute associated with the pedestrian, and the attribute may indicate whether the pedestrian is an authorized agent (e.g., a first responder, a traffic control person, and/or the like). Based at least in part on the pedestrian being an authorized agent, any detected attributes of the pedestrian may be input into a planning component of the vehicle. In contrast, if the output from the machine-learned model does not include an indication that the pedestrian is an authorized agent (e.g., the pedestrian is an ordinary pedestrian who is not a first responder, traffic control person, etc.), then any detected gestures of the pedestrian may be input into a prediction component of the vehicle. In other words, if a detected pedestrian is an authorized agent, then a gesture may be directly used by the planning component to control a trajectory of the vehicle, whereas if the pedestrian is not an authorized agent, the gesture may be input into a prediction component to predict an action of the pedestrian, and the predicted action may then be input into the planning component or otherwise used to control the vehicle. An example prediction component and an example planning component, as well as their exemplary functionality, are described in further detail below with respect to FIG. 2.

In some examples, the machine-learned model or a dataset used to train the machine-learned model may be varied based on a geographical location in which a vehicle is operating. In this way, the machine-learned model may be able to account for differences in gestures across jurisdictions (e.g., based on socioeconomic changes and/or influences). For instance, in a first geographical region a specific gesture may have a first meaning and in a second geographical region the specific gesture may have a second meaning that is different from the first meaning. As such, the machine-learned model may be varied to account for these factors. In some instances, location data associated with the geographical location may be received from a vision sensor of the vehicle or another sensor of the vehicle, and the location data may include a classification of the environment the vehicle is operating in. For instance, a classification of the environment may include a construction zone, an accident scene, a parking lot, a rural area, and/or the like. This location data including the classification of the environment may also, in some examples, be inferred from accident reports, reporting from other vehicles, and/or the like.

In some examples, traffic and/or environment data may be used to train the machine-learned model and/or as an input to the machine-learned model that may be used to determine gestures and/or attributes of pedestrians. For instance, data indicating a location of a crosswalk in the environment may be used to determine and/or classify whether a pedestrian is in a crosswalk or jaywalking. Pedestrians in these situations/areas are likely to be doing gestures which may be used for data collection for training and/or for inference. Additionally, incident reports in such areas (e.g., vehicle stuck in crosswalk, vehicle yielding to jaywalker, etc.) may be used as training data inputs for training the machine-learned model.

Additionally, in some examples, location data (e.g., GPS data) and/or traffic data may be input into the machine-learned model and the machine-learned model may determine a classification of a pedestrian based at least in part on the location data. For instance, location data and/or traffic data may indicate that the vehicle is in a construction zone, and the location data may be used by the machine-learned model to help detect that a pedestrian is an authorized agent (e.g., construction worker, traffic control person, etc.). As another example, location data and/or traffic data may indicate that the vehicle is approaching a scene of an accident, and the location data and/or traffic data may be used by the machine-learned model to help detect that a pedestrian is a police officer, fireman, or other authorized agent. In some examples, the location data and/or traffic data may be input into the machine-learned model substantially simultaneously with the sensor data. This disclosure also provides an example method for training a machine-learned model to detect attributes and gestures of pedestrians. The example method may include, for instance, receiving sensor data associated with a pedestrian in an environment of a vehicle. The method may also include receiving a gesture of the pedestrian based at least in part on the sensor data. Additionally, or alternatively, an attribute of the pedestrian may also be received based at least in part on the sensor data. In some examples, the received gesture and/or sensor data may be determined by a trained machine-learned model, a user or administrator who is training the machine-learned model, and the like.

In some examples, the method may include inputting the sensor data into the machine-learned model that is being trained. In this way, the machine-learned model may analyze the sensor data and output at least one of a predicted gesture of the pedestrian and/or a predicted attribute associated with the pedestrian. In some examples, a difference may be determined between the gesture and the predicted gesture. Additionally, or alternatively, a difference may be determined between the attribute and the predicted attribute.

Based at least in part on the difference(s), the method may include altering a parameter of the machine-learned model to minimize the difference(s) to obtain a trained machine-learned model that is configured to determine the gesture of the pedestrian and/or the attribute of the pedestrian.

The techniques described herein can be implemented in a number of ways. Example implementations are provided below with reference to the following figures. Although discussed in the context of an autonomous vehicle, the techniques described herein can be applied to a variety of systems requiring control and/or interaction with pedestrians in an environment and is not limited to autonomous vehicles. In another example, the systems, methods, and apparatuses can be used in an aviation or in a nautical context, as well as a security context. Furthermore, although many of the examples described herein are with reference to image data, the techniques disclosed herein can be similarly performed based on inputs consisting of different data types (e.g., lidar data, radar data, sonar data, etc.).

FIG. 1 is a pictorial flow diagram illustrating an example data flow 100 that is associated with detecting attributes and/or gestures of pedestrians based on image data 102 captured by a vehicle 104. The image data 102 may include one or more image frames 106 representing an environment in which the vehicle 104 is operating. For instance, the image frame 106 includes a pedestrian 108 and one or more objects 110 (e.g., vehicles). The pedestrian 108 shown in FIG. 1 is making a "vehicle-go" gesture to the vehicle 104. As used, herein, a "vehicle-go" gesture is a gesture made by a pedestrian, such as a hand signal, a wave, a nod, a shrug, or another type of motion or behavior that objectively communicates the pedestrian's intention to refrain from performing an action (e.g., crossing the crosswalk 304) and/or give a vehicle a right-of-way to proceed along a trajectory.

The vehicle 104 may capture the image data 102 and input the image data into a detector 112. The detector 112 may detect the pedestrian 108 and the one or more objects 110 within the image frame 106. Additionally, the detector 112 may generate or determine one or more bounding boxes 114 associated with the pedestrian 108 and the one or more objects 110. The detector 112 may then input the image data 102 or the image frame 106, including the bounding boxes 114, into the tracker 116. In some instances, the detector 112 may crop or scale the image frame 118 to a specific size before inputting it into the tracker 116. In other instances, the tracker 116 may scale the image frames 118 to the specific size. In some examples, the bounding boxes 114 may be padded (e.g., expanded in either a vertical or horizontal direction) prior to being input into tracker 116 or machine-learned model 122 to ensure that hand gestures, signs, and/or other features of a pedestrian are analyzed using the techniques disclosed herein.

The tracker 116 may keep track of changes or movements associated with the detected pedestrian 108 and/or the detected objects 110. For instance, the tracker 116 may track the differences between the different scaled image frames 118 with respect to various times along a timeline 120. For instance, between times $T_{0-N}$ to $T_0$ (where $T_0$ represents a present time), the tracker 116 may keep track of the movement of the pedestrian 108. In some examples, time intervals between the times $T_0$, $T_{0-1}$, $T_{0-2}$, etc. may be equal. For instance, the time intervals between the times $T_0$, $T_{0-1}$, $T_{0-2}$, etc. may be 0.5 seconds, 1 second, 2 seconds, etc. Additionally, in some examples the time intervals may not be equal. For instance, a first time interval between times $T_0$ and $T_{0-1}$ may be 1 second and a second time interval between the times $T_{0-1}$ and $T_{0-2}$ may be 2 seconds.

Additionally, the multiple scaled image frame(s) 118 may be input into the machine-learned model 122. In some examples, the multiple scaled image frame(s) 118 may be input into the machine-learned model 122 at the time (e.g., $T_0$, $T_{0-1}$, $T_{0-2}$, etc.) at which they are captured. In other words, the multiple scaled image frame(s) 118 may not necessarily be input into the machine-learned model 122 all at once. However, in some instances the multiple scaled image frame(s) 118 may be input into the machine-learned model at the same time.

The machine-learned model 122 may generate output data 124 based at least in part on the inputted scaled image frames 118. The output data 124 may include an indication of an attribute 126 associated with the pedestrian 108 in the image frame 106. As shown in FIG. 1, the attribute 126 indicates that the pedestrian 108 is standing still. Additionally, the output data 124 may include an indication of a gesture 128 of the pedestrian 108. For example, the gesture 128 in FIG. 1 corresponds with the pedestrian 108 communicating a "vehicle-go" gesture (e.g., waving the vehicle to proceed before the pedestrian 108 crosses the crosswalk). In some examples, the attribute 126 and the gesture 128 may be added to or otherwise included within the image frame 106. Additionally, the attribute 126, the gesture 128, and/or the updated image frame 106 may be sent to a controller of the vehicle 104 to determine a driving instruction for the vehicle 104 based at least in part on the attribute 126 or the gesture 128.

Figure 2:
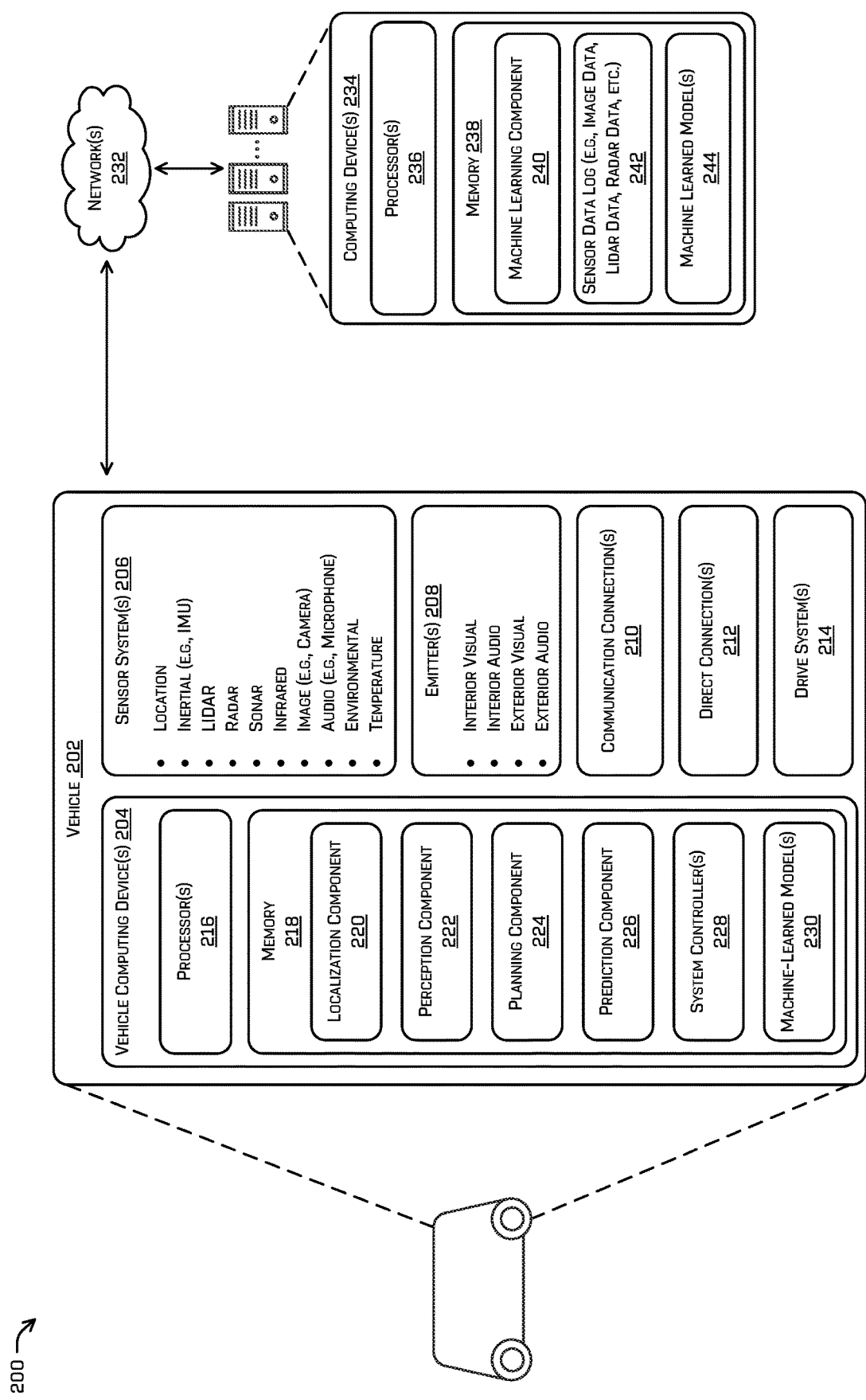
FIG. 2 is a block diagram illustrating an example system for implementing some of the various technologies described herein.

FIG. 2 is a block diagram illustrating an example system 200 for implementing some of the various technologies described herein. In at least one example, the example system 200 may include a vehicle 202, which can be similar to the vehicle 104 described above with reference to FIG. 1. In the illustrated example system 200, the vehicle 202 is an autonomous vehicle: however, the vehicle 202 may be any other type of vehicle.

The vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 202 may be any configuration of vehicle, such as, for example, a van, a sport utility vehicle, a cross-over vehicle, a truck, a bus, an agricultural vehicle, and/or a construction vehicle. The vehicle 202 may be powered by one or more internal combustion engines, one or more electric motors, hydrogen power, any combination thereof, and/or any other suitable power sources. Although the vehicle 202 has four wheels, the systems and methods described herein may be incorporated into vehicles having fewer or a greater number of wheels, and/or tires. The vehicle 202 may have four-wheel steering and may operate generally with equal or similar performance characteristics in all directions, for example, such that a first end of the vehicle 202 is the front end of the vehicle 202 when traveling in a first direction, and such that the first end becomes the rear end of the vehicle 202 when traveling in the opposite direction. Similarly, a second end of the vehicle 202 is the front end of the vehicle when traveling in the second direction, and such that the second end becomes the rear end of the vehicle 202 when traveling in the opposite direction. These example characteristics may facilitate greater maneuverability, for example, in small spaces or crowded environments, such as parking lots and/or urban areas.

The vehicle 202 may include one or more computing device(s) 204, one or more sensor system(s) 206, one or more emitter(s) 208, one or more communication connection(s) 210 (also referred to as communication devices and/or modems), at least one direct connection 212 (e.g., for physically coupling with the vehicle 202 to exchange data and/or to provide power), and one or more drive system(s) 214. The one or more sensor system(s) 206 may be configured to capture sensor data (e.g., image data, lidar data, radar data, etc.) associated with an environment in which the vehicle 202 is operating.

The sensor system(s) 206 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 206 may include multiple instances of each of these or other types of sensors. For instance, the time-of-flight sensors may include individual time-of-flight sensors located at the corners, front, back, sides, and/or top of the vehicle 202. As another example, the camera sensors may include multiple camera modules disposed at various locations about the exterior and/or interior of the vehicle 202. The sensor system(s) 206 may provide input to the computing device(s) 204.

The vehicle 202 may also include one or more emitter(s) 208 for emitting light and/or sound. The one or more emitter(s) 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 may also include one or more communication connection(s) 210 that enable communication between the vehicle 202 and one or more other local or remote computing device(s) (e.g., a remote teleoperations computing device) or remote services. For instance, the communication connection(s) 210 may facilitate communication with other local computing device(s) on the vehicle 202 and/or the drive system(s) 214. Also, the communication connection(s) 210 may allow the vehicle 202 to communicate with other nearby computing device(s) (e.g., other nearby vehicles, traffic signals, etc.).

The communications connection(s) 210 may include physical and/or logical interfaces for connecting the computing device(s) 204 to another computing device or one or more external networks 232 (e.g., the Internet). For example, the communications connection(s) 210 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 202 may include one or more drive system(s) 214. In some examples, the vehicle 202 may have a single drive system 214. In at least one example, if the vehicle 202 has multiple drive systems 214, individual drive systems 214 may be positioned on opposite ends of the vehicle 202 (e.g., the front and the rear, etc.). In at least one example, the drive system(s) 214 may include one or more sensor system(s) 206 to detect conditions of the drive system(s) 214 and/or the surroundings of the vehicle 202. By way of example and not limitation, the sensor system(s) 206 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 214. In some cases, the sensor system(s) 206 on the drive system(s) 214 may overlap or supplement corresponding systems of the vehicle 202 (e.g., sensor system(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor system(s) 206 and to control operation of the various vehicle systems. In some examples, the drive system controller may include one or more processor(s) and memory communicatively coupled with the one or more processor(s). The memory may store one or more modules to perform various functionalities of the drive system(s) 214. Furthermore, the drive system(s) 214 also include one or more communication connection(s) that enable communication by the respective drive system with one or more other local or remote computing device(s).

The computing device(s) 204 may include one or more processor(s) 216 and memory 218 communicatively coupled with the one or more processor(s) 216. In the illustrated example, the memory 218 of the computing device(s) 204 stores a localization component 220, a perception component 222, a planning component 224, a prediction component 226, one or more system controller(s) 228, and one or more machine-learned models 230. Though depicted as residing in the memory 218 for illustrative purposes, it is contemplated that the localization component 220, the perception component 222, the planning component 224, the prediction component 226, the one or more system controller(s) 228, and the one or more machine-learned models 230 may additionally, or alternatively, be accessible to the computing device(s) 204 (e.g., stored in a different component of vehicle 202 and/or be accessible to the vehicle 202 (e.g., stored remotely).

In the memory 218 of the computing device(s) 204, the localization component 220 may include functionality to receive data from the sensor system(s) 206 to determine a position of the vehicle 202. For example, the localization component 220 may include and/or request/receive a three-dimensional map of an environment and may continuously determine a location of the autonomous vehicle within the map. In some instances, the localization component 220 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 220 may provide data to various components of the vehicle 202 to determine an initial position of an autonomous vehicle for generating a trajectory, as discussed herein.

The perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 222 may include functionality to store perception data generated by the perception component 222. In some instances, the perception component 222 may determine a track corresponding to an object that has been classified as an object type. For purposes of illustration only, the perception component 222, using sensor system(s) 206 may capture one or more images of an environment. The sensor system(s) 206 may capture images of an environment that includes an object, such as a building, vehicle, trees, streetlights, pedestrians, etc.

The stored perception data may, in some examples, include fused perception data captured by the vehicle. Fused perception data may include a fusion or other combination of sensor data from sensor system(s) 206, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The planning component 224 may determine a path for the vehicle 202 to follow to traverse through an environment. For example, the planning component 224 may determine various routes and paths and various levels of detail. In some instances, the planning component 224 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 224 may alternatively, or additionally, use data from the perception component 222 to determine a path for the vehicle 202 to follow to traverse through an environment. For example, the planning component 224 may receive data from the perception component 222 regarding objects associated with an environment. Using this data, the planning component 224 may determine a route to travel from a first location (e.g., a current location) to a second location (e.g., a target location) to avoid objects in an environment. In at least some examples, such a planning component 224 may determine there is no such collision free path and, in turn, provide a path which brings vehicle 202 to a safe stop avoiding all collisions and/or otherwise mitigating damage. In at least one example, the planning component 224 may receive indications of attributes and/or gestures of pedestrians in the environment of the vehicle and determine, among other things, a path for the vehicle to travel, to stop the vehicle, to accelerate the vehicle, to maintain a trajectory of the vehicle, etc. For instance, if a detected pedestrian in the environment of the vehicle 202 is determined to be an authorized agent (e.g., police officer, fire fighter, emergency medical personnel, etc.), then a gesture of the pedestrian may be inputted into the planning component 224 instead of, or in addition to, the prediction component 226 described below.

The memory 218 of the computing device(s) 204 may additionally store a prediction component 226 that is configured to estimate current, and/or predict future, characteristics or states of an object (e.g., a pedestrian, animal, etc.), such as pose, speed, trajectory, velocity, yaw, yaw rate, roll, roll rate, pitch, pitch rate, position, acceleration, or other characteristics, based on one or more images of the object. For instance, the prediction component 226 may receive image data from sensor data captured by a camera or other image sensor of sensor system(s) 206 and predict one or more of the foregoing characteristics of the object. The prediction can be made based on a single image or multiple images (e.g., multiple sequential image frames) depicting the object. In at least one example, a detected gesture of a pedestrian may be received by the prediction component 226. The prediction component 226 may determine a predicted action of the pedestrian (e.g., predicted trajectory, movement, etc.) or the vehicle 202 based at least in part on the gesture. In other words, the prediction component 226 may use a detected gesture of a pedestrian to assist in determining a future trajectory of the pedestrian (e.g., whether the pedestrian will cross a road, remain in their current position, and the like).

In at least one example, the computing device(s) 204 may include one or more system controller(s) 228, which may be configured to control steering, propulsion, braking, safety, emitters, communication, and other systems of the vehicle 202. These system controller(s) 228 may communicate with and/or control corresponding systems of the drive system(s) 214 and/or other components of the vehicle 202, which may be configured to operate in accordance with a path provided from the planning component 224.

The memory 218 of the vehicle computing devices 204 may additionally include the one or more machine-learned models 230. In some examples, the machine-learned models 230 may include a machine-learned model that is trained to detect attributes and/or gestures of pedestrians. In various examples, the machine-learned model(s) 230 may be implemented as neural network(s), convolution neural network(s), or recurrent neural network(s).

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The vehicle 202 may connect to one or more computing device(s) 234 via one or more network(s) 232. The computing device(s) 234 include one or more processor(s) 236 and memory 238 communicatively coupled with the one or more processor(s) 236. In at least one instance, the one or more processor(s) 236 may be similar to the processor(s) 216 and the memory 238 may be similar to the memory 218. In the illustrated example, the memory 238 of the computing device(s) 234 stores a machine learning component 240, a sensor data log 242, and one or more machine-learned model(s) 244. Though depicted as residing in the memory 238 for illustrative purposes, it is contemplated that the machine learning component 240, the sensor data log 242, and the machine-learned model(s) 244 may additionally, or alternatively, be accessible to the computing device(s) 234 (e.g., stored in a different component of computing device(s) 234 and/or be accessible to the computing device(s) 234 (e.g., stored remotely).

In the memory 238 of the computing device(s) 234, the machine learning component 240 may be used to train the one or more machine-learned model(s) 230 and/or 244. For instance, the machine-learning component 240 may access training data stored in the sensor data log 242 in order to train the one or more machine-learned model(s) 230 and/or 244. The sensor data log 242 may include various data logs based on different sensor data types, such as image data, lidar data, radar data, and the like. Additionally, the sensor data log 242 may include sensor data associated with pedestrians who are performing various gestures, as well as various pedestrians that have different attributes. The machine learning component 240 may include functionality to receive real data, modified data, and/or simulated data to train one or more untrained neural networks to generate a plurality of trained neural networks. During training, the machine learning model component 240 may adjust weights, filters, connections between layers, and/or parameters for training the individual untrained neural networks to perform pedestrian gesture and attribute detection (or other tasks), as discussed herein. In some instances, the machine learning component 240 may use supervised or unsupervised training.

Additionally, the memory 238 stores the machine-learned model(s) 244. In at least one example, the machine-learned models 244 may be similar to the machine-learned models 230 stored by the memory 218 of the vehicle computing devices 204. For instance, the machine-learned models 244 may include the machine-learned model that is trained to detect attributes and/or gestures of pedestrians. In various examples, the machine-learned model(s) 244 may be implemented as neural network(s), convolution neural network(s), or recurrent neural network(s).

The processor(s) 216 of the computing device(s) 204 and the processor(s) 236 of the computing device(s) 234 may be any suitable processor capable of executing instructions to process data and perform operations as described herein. By way of example and not limitation, the processor(s) 216 and 236 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 218 of the computing device(s) 204 and the memory 238 of the computing device(s) 234 are examples of non-transitory computer-readable media. The memory 218 and 238 may store an operating system and one or more software applications, instructions, programs, and/or data to implement the methods described herein and the functions attributed to the various systems. In various implementations, the memory 218 and 238 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 218 and 238 may be implemented as one or more neural network(s).

Figure 3:
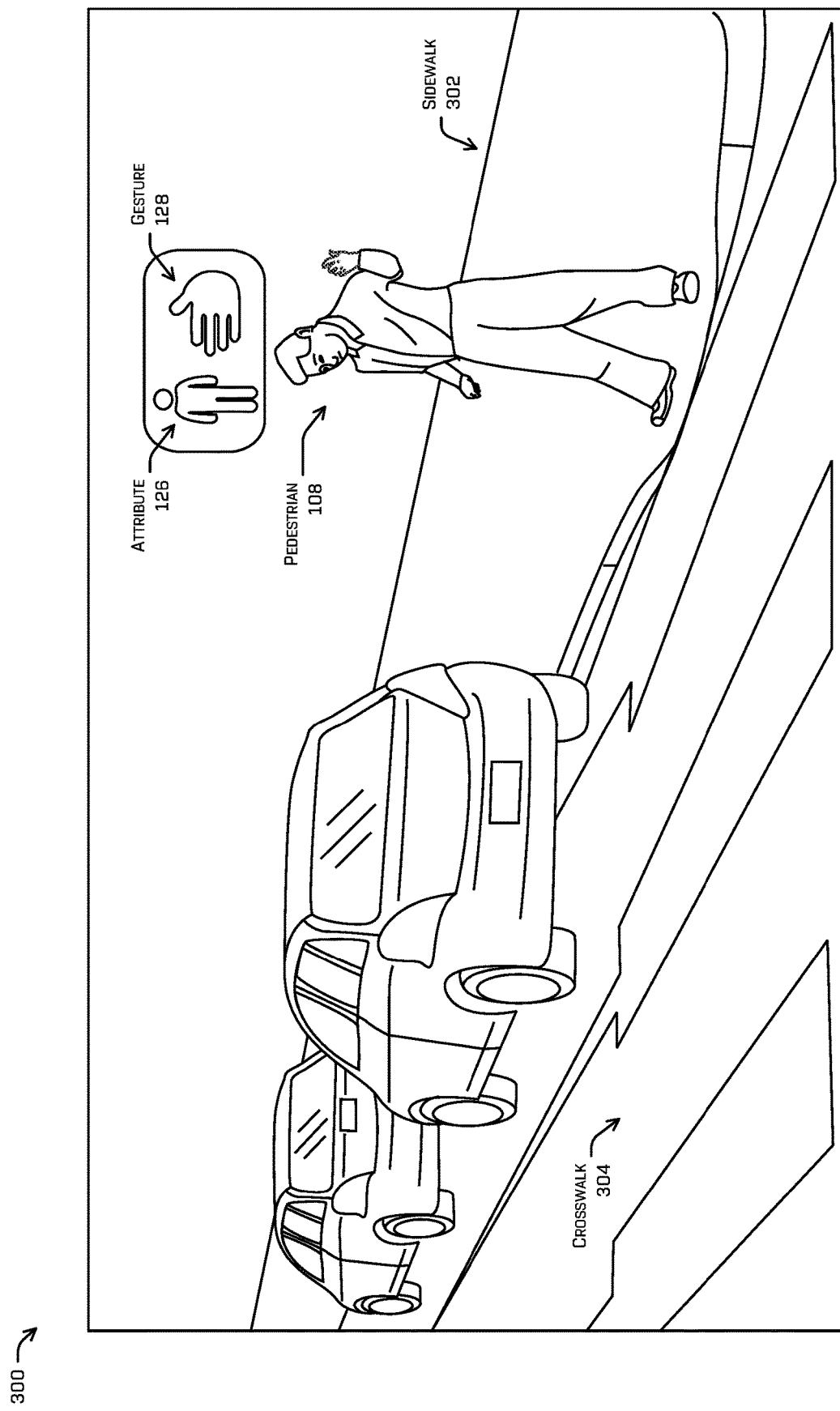
FIG. 3 illustrates an example image in which an attribute and a gesture of a pedestrian have been determined. The gesture corresponds with a "vehicle-go" gesture.

FIG. 3 illustrates an example image 300 in which an attribute 126 and a gesture 128 of a pedestrian 108 have been determined. The image 300 may have been captured, for instance, by a vehicle traversing an environment, such as the vehicle 104.

The attribute 126 indicates that the pedestrian 108 is standing still (e.g., not walking, running, etc.), and the gesture 128 indicates that the pedestrian 108 is communicating a vehicle-go signal to give the vehicle that captured the image 300 the right-of-way. For instance, the pedestrian 108 is shown standing on a sidewalk 302 and attempting to cross a street using a crosswalk 304. However, the pedestrian 108, by communicating the vehicle-go signal, is telling the vehicle that captured the image 300 to proceed along its trajectory and not yield for the pedestrian 108 to cross the crosswalk 304.

Figure 4:
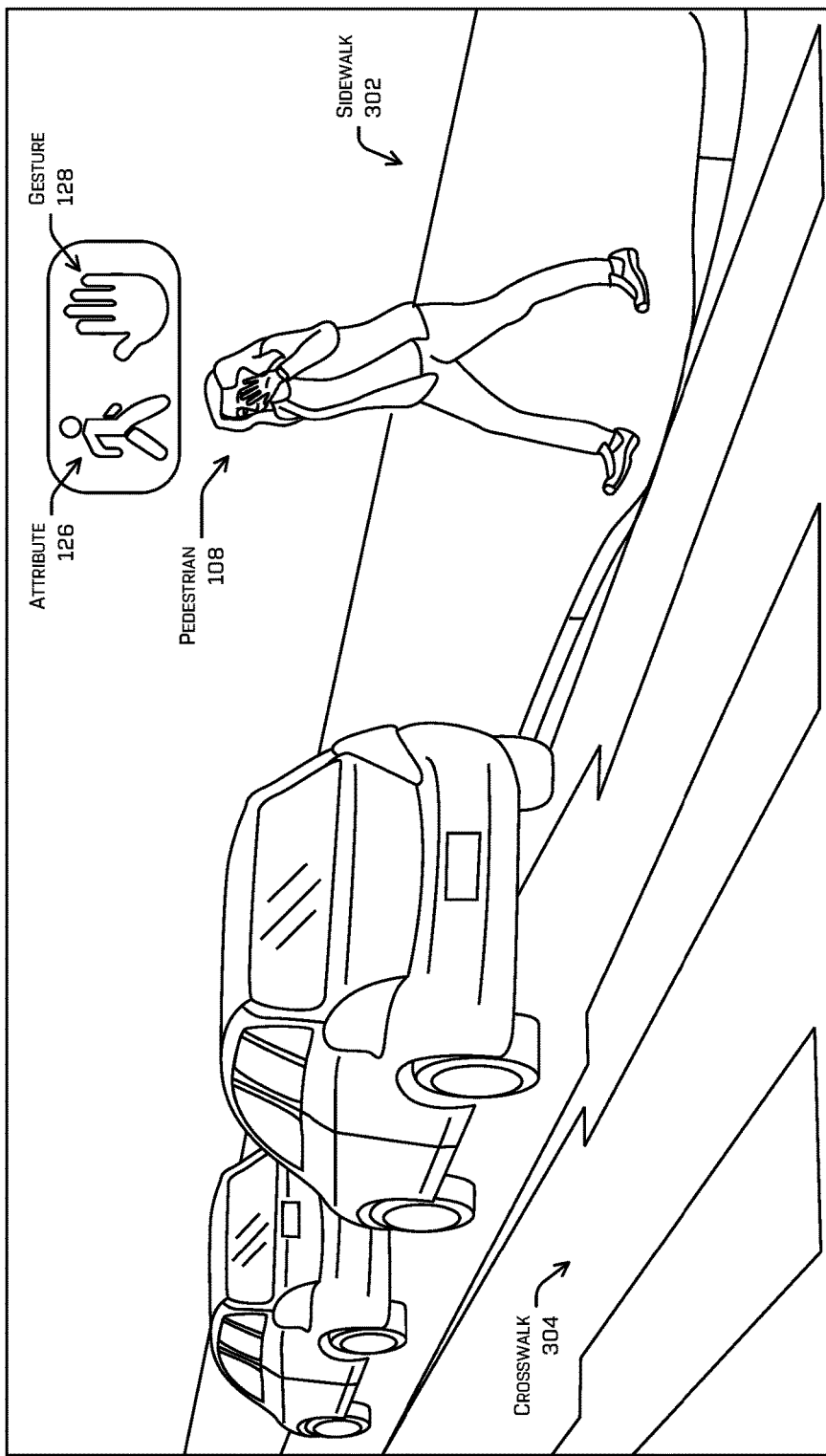
FIG. 4 illustrates another example image in which an attribute and a gesture of a pedestrian have been determined. The gesture corresponds with a "pedestrian-go" gesture.

FIG. 4 illustrates another example image 400 in which an attribute 126 and a gesture 128 of a pedestrian 108 have been determined. The image 400 may have been captured, for instance, by a vehicle traversing an environment, such as the vehicle 104.

The attribute 126 indicates that the pedestrian 108 is walking, and the gesture 128 indicates that the pedestrian 108 is communicating a "pedestrian-go" gesture. As used herein, a "pedestrian-go" gesture is a gesture made by a pedestrian, such as a hand signal, a wave, a nod, a shrug, or another type of motion or behavior that objectively communicates the pedestrian's intention to perform an action, such as crossing the crosswalk 304 before the vehicle. For instance, the pedestrian 108 is shown walking from the sidewalk 302 and into the crosswalk 304 in an attempt to cross the street. The pedestrian 108, by communicating the pedestrian-go gesture, is telling the vehicle that captured the image 400 to stop and/or yield for the pedestrian 108 to cross the crosswalk 304.

Figures 5A, 5B, 5C, 5D:
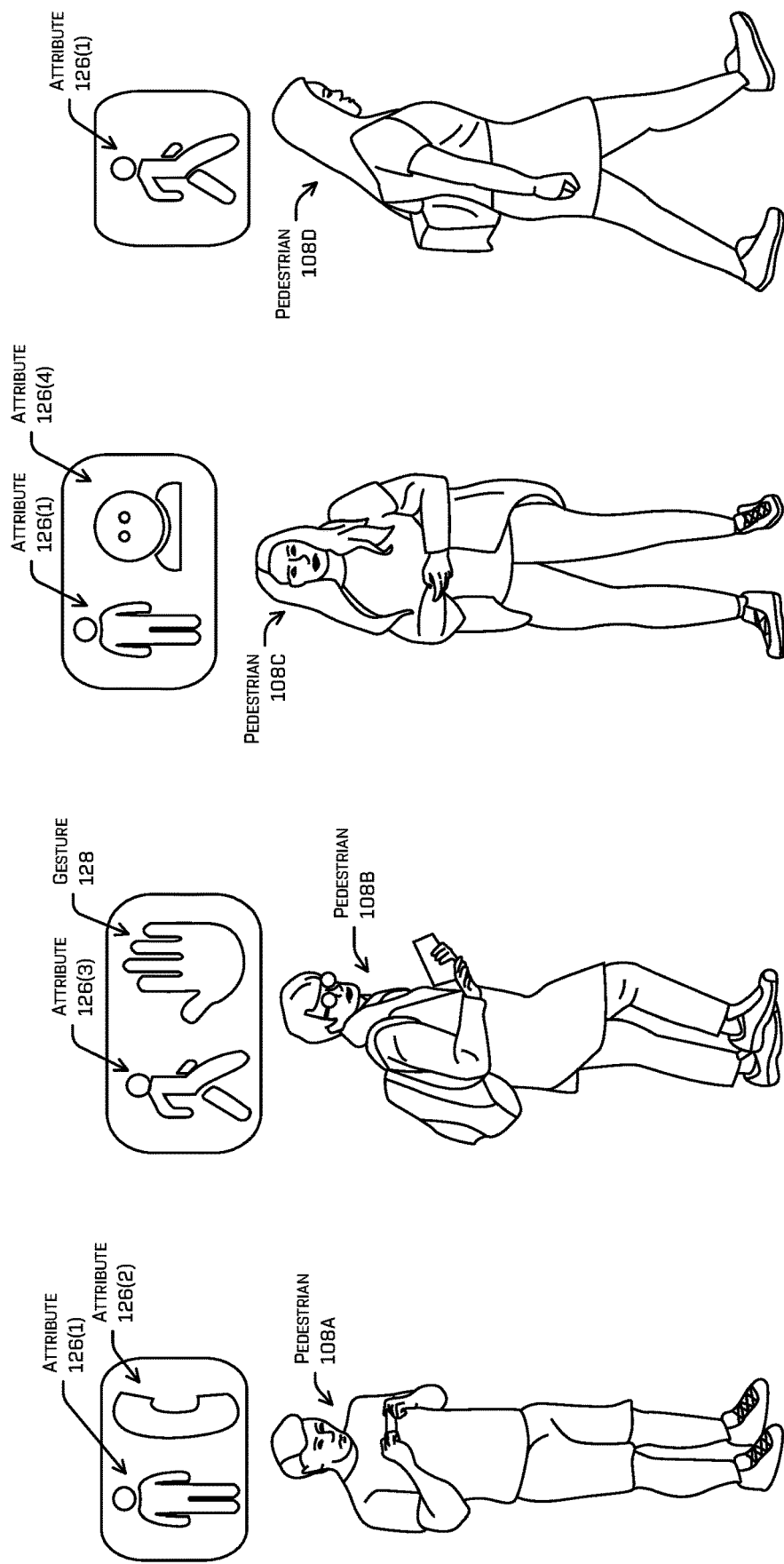
FIGS. 5A-5D illustrate example pedestrians having various example attributes and example gestures.

FIGS. 5A-5D illustrate example pedestrians 108 having various example attributes and example gestures. The example pedestrian 108A of FIG. 5A is depicted as standing upright and looking at his phone. As such, a first attribute 126(1) associated with the pedestrian 108A indicates that the pedestrian 108A is standing upright and stationary. Additionally, as second attribute 126(2) associated with the pedestrian 108A indicates that the pedestrian 108A is looking at his phone. The second attribute 126(2) indicating that the pedestrian 108A is looking at his phone may be used by a controller of a vehicle to determine a driving instruction that takes into account the fact that the pedestrian 108A may be less aware of his surroundings and not paying attention since he is looking at his phone.

The example pedestrian 108B shown in FIG. 5B is depicted as walking, holding their phone, and making a pedestrian-go gesture by holding their hand up. As such, a first attribute 126(3) associated with the pedestrian 108B indicates that the pedestrian 108B is walking. Additionally, a gesture 128 associated with the pedestrian 108B indicates that the pedestrian 108B is communicating a pedestrian-go gesture. For example, the pedestrian 108B may be entering a crosswalk and making the pedestrian-go gesture to oncoming traffic. In some examples, the machine-learned model may be trained to detect that the pedestrian 108B is holding an object (e.g., a phone as shown in FIG. 5B, a book, a cane, a briefcase, a purse, etc.), and this may be used to determine a driving instruction that takes into account that the pedestrian 108B is holding an object.

The example pedestrian 108C shown in FIG. 5C is depicted as standing upright and looking in the direction of, for instance, a vehicle. As such, a first attribute 126(1) associated with the pedestrian 108C indicates that the pedestrian 108C is standing upright and stationary. Additionally, a second attribute 126(4) associated with the pedestrian 108C indicates that the pedestrian 108C is looking in the direction of the vehicle. In some examples, the second attribute 126(4) may be used to determine a driving instruction that takes into account that the pedestrian 108C may be more aware of her surroundings and/or paying more attention to her surroundings as compared to a pedestrian who is not looking in the direction of the vehicle.

The example pedestrian 108D shown in FIG. 5D is depicted as walking. As such, an attribute 126(1) associated with the pedestrian 108D indicates that the pedestrian 108D is walking. In the above examples shown in FIGS. 5A-5D, the attributes and/or gestures of the pedestrians 108A-108D may be determined based on inputting one or more instances of sensor data into a machine learned model that is configured to determine the attributes and/or the gestures.

Figures 6A, 6B, 6C:
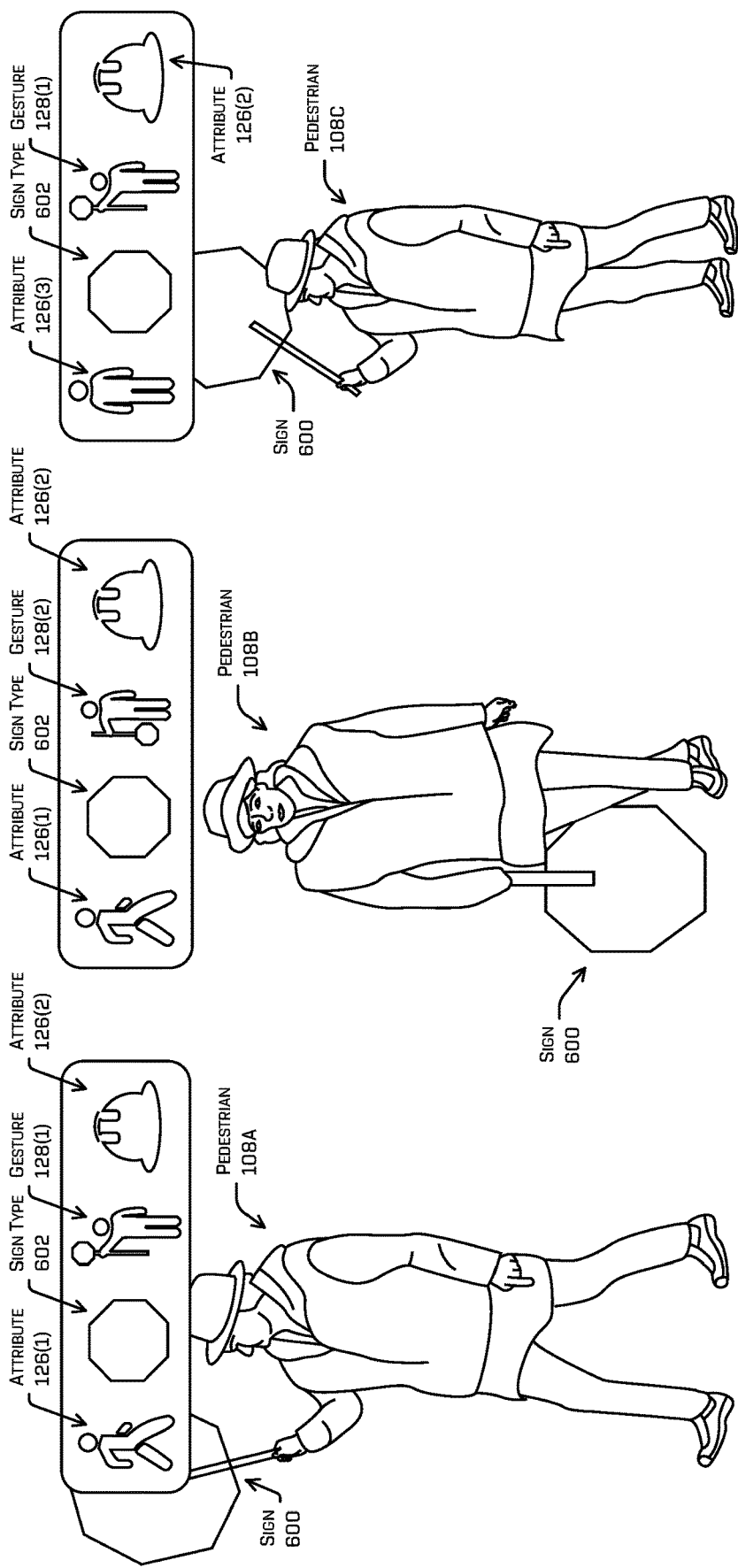
FIGS. 6A-6C illustrate different poses of an example pedestrian who is holding a sign. Different attributes and/or gestures may be determined for the example pedestrian based on their respective pose.

FIGS. 6A-6C illustrate different poses of example pedestrians who are holding signs 600. Different attributes and/or gestures may be determined for the example pedestrians based on their respective pose. The attributes, gestures, and sign types shown in FIGS. 6A-6C may have been determined by a machine-learned model as described herein.

For instance, in FIG. 6A the pedestrian 108A is depicted as a construction worker who is walking and holding the sign 600 in a raised position. As such, a first attribute 126(1) associated with the pedestrian 108A indicates that the pedestrian 108A is walking. Additionally, a second attribute 126(2) associated with the pedestrian 108A indicates that the pedestrian is a construction worker. Further, a gesture 128(1) associated with the pedestrian 108A indicates that the pedestrian 108A is raising the sign 600, therefore communicating that a traffic rule associated with the sign 600 is to be followed by vehicles. Also, a sign type 602 indicating the traffic rule (e.g., stop, yield, slow, etc.) is also displayed. In some examples, a shape of the sign type 602 may correspond to the traffic rule and/or the sign 600. For instance, the sign type 602 indicates that the sign 600 is a stop sign. However, the sign type 602 may, in some examples, be represented by different shapes, colors, patterns, text, etc. to indicate other traffic rules and/or signs, such as a triangle for a yield sign, a circle with a horizontal bar for a do-not-enter sign, and/or the like.

In FIG. 6B, the pedestrian 108B is depicted as walking and holding the sign 600 in a lowered position. As such, a first attribute 126(1) associated with the pedestrian 108B indicates that the pedestrian 108B is walking. Additionally, a second attribute 126(2) associated with the pedestrian 108B indicates that the pedestrian is a construction worker. Further, a gesture 128(2) associated with the pedestrian 108B indicates that the sign 600 is lowered, therefore communicating that the traffic rule associated with the sign 600 is not in effect. Also, the sign type 602 indicating the traffic rule associated with the sign 600 (e.g., stop) is also determined.

In FIG. 6C, the pedestrian 108C is depicted as standing and holding the sign 600 in a raised position. As such, a first attribute 126(3) associated with the pedestrian 108C indicates that the pedestrian 108C is standing upright and stationary. Additionally, a second attribute 126(2) associated with the pedestrian 108C indicates that the pedestrian is a construction worker. Further, a gesture 128(1) associated with the pedestrian 108C indicates that the sign 600 is raised, therefore communicating that the traffic rule associated with the sign 600 is in effect and is to be followed by vehicles. Also, the sign type 602 indicating the traffic rule associated with the sign 600 (e.g., stop) is also determined.

In FIGS. 6A-6C, the pedestrian is depicted as an authorized agent (e.g., a traffic control person). As such, the gestures of the pedestrian and/or the state of the sign 600 held by the pedestrian may be used as inputs into a planning component of the vehicle to determine a trajectory for the vehicle to follow.

Figure 7:
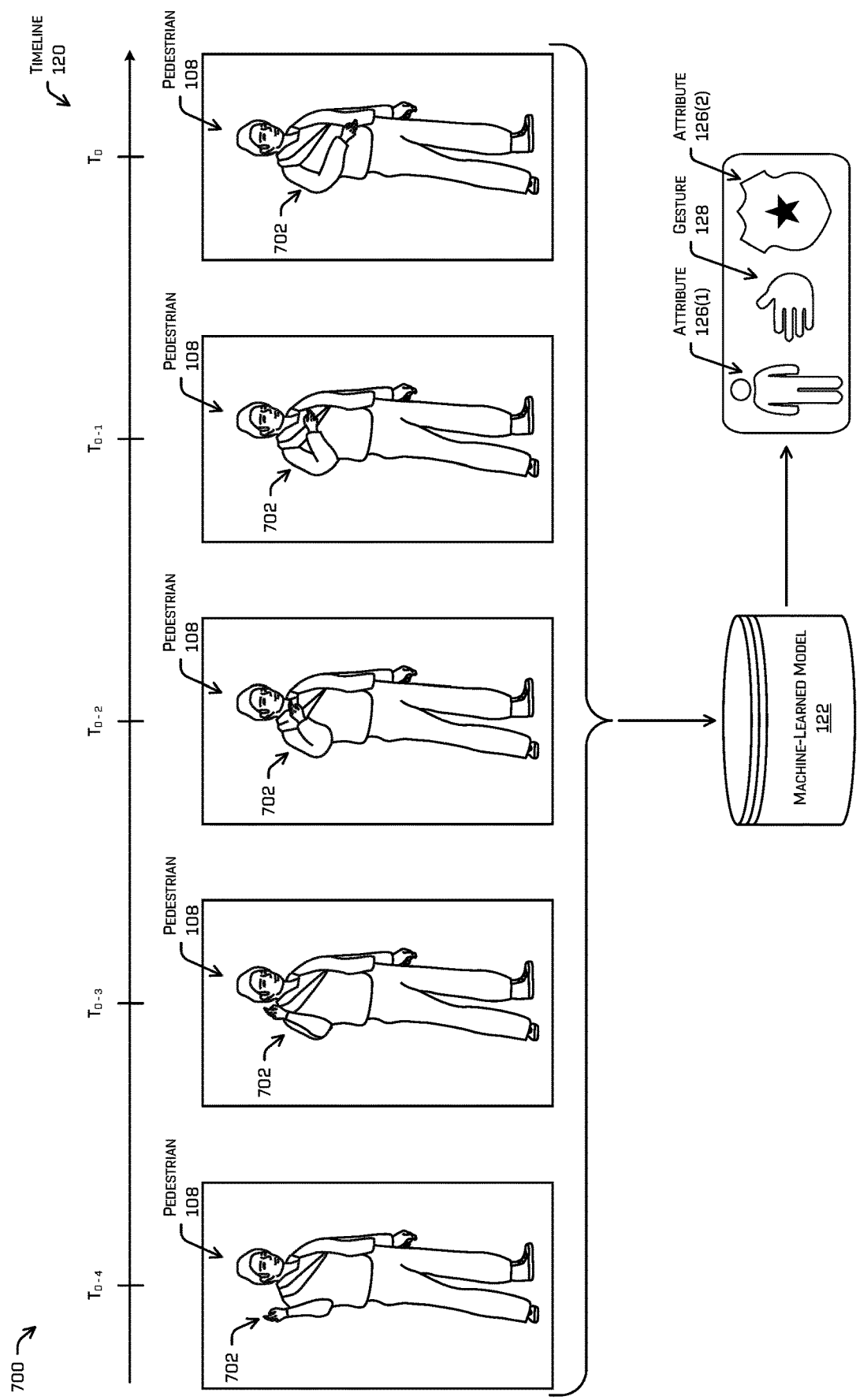
FIG. 7 is a pictorial flow diagram illustrating an example data flow in which multiple images of a pedestrian captured at different times are input into a machine-learned model that determines attributes and gestures of the pedestrian.

FIG. 7 is a pictorial flow diagram illustrating an example data flow 700 in which multiple images of a pedestrian 108 captured at different times are input into a machine-learned model 122 that determines attributes and gestures of the pedestrian 108. At the different time intervals $T_0$, $T_{0-1}$, $T_{0-2}$, $T_{0-3}$, and $T_{0-4}$ of the timeline 120, (where $T_0$ represents a present time), a position of the arm 702 of the pedestrian 108 changes, corresponding to the pedestrian 108 making a vehicle-go gesture.

The various images of the pedestrian 108 may be input into the machine-learned model 122, as shown. In some examples, the image of the pedestrian 108 at $T_{0-4}$ may be input into the machine learned model at time $T_{0-4}$, the image of the pedestrian 108 at $T_{0-3}$ may be input into the machine learned model at time $T_{0-3}$, the image of the pedestrian 108 at $T_{0-2}$ may be input into the machine learned model at time $T_{0-2}$, and so forth. In other examples, all of the images of the pedestrian 108 at the time intervals $T_0$ to $T_{0-4}$ may be input into the machine-learned model 122 simultaneously or in any order. Additionally, more or less images of the pedestrian 108 may be input into the machine learned model 122 than shown in FIG. 7.

The pedestrian 108 of FIG. 7 is depicted as standing upright and stationary, dressed in a police uniform, and waving his arm/hand to convey a vehicle-go gesture. Based at least in part on some or all of the images of the pedestrian 108 captured at the different instances of time of the timeline 120, the machine-learned model 122 may determine that the pedestrian 108 is a police officer who is standing upright and making the vehicle-go gesture. Accordingly, the machine-learned model 122 may output a first attribute 126(1) associated with the pedestrian 108, the first attribute 126(1) indicating that the pedestrian 108 is standing upright and stationary. Additionally, the machine-learned model 122 may output the second attribute 126(2) associated with the pedestrian 108, the second attribute 126(2) indicating that the pedestrian 108 is a police officer and/or first responder. Further, the machine-learned model 122 may output a gesture 128 associated with the pedestrian 108, the gesture 128 indicating that the pedestrian 108 is making the vehicle-go gesture. Because the pedestrian 108 is an authorized agent (e.g., police officer/first responder), the gesture 128 may be used as an input into a planning component of a vehicle, instead of, or in addition to, inputting the gesture into a prediction component of the vehicle.

Figure 8:
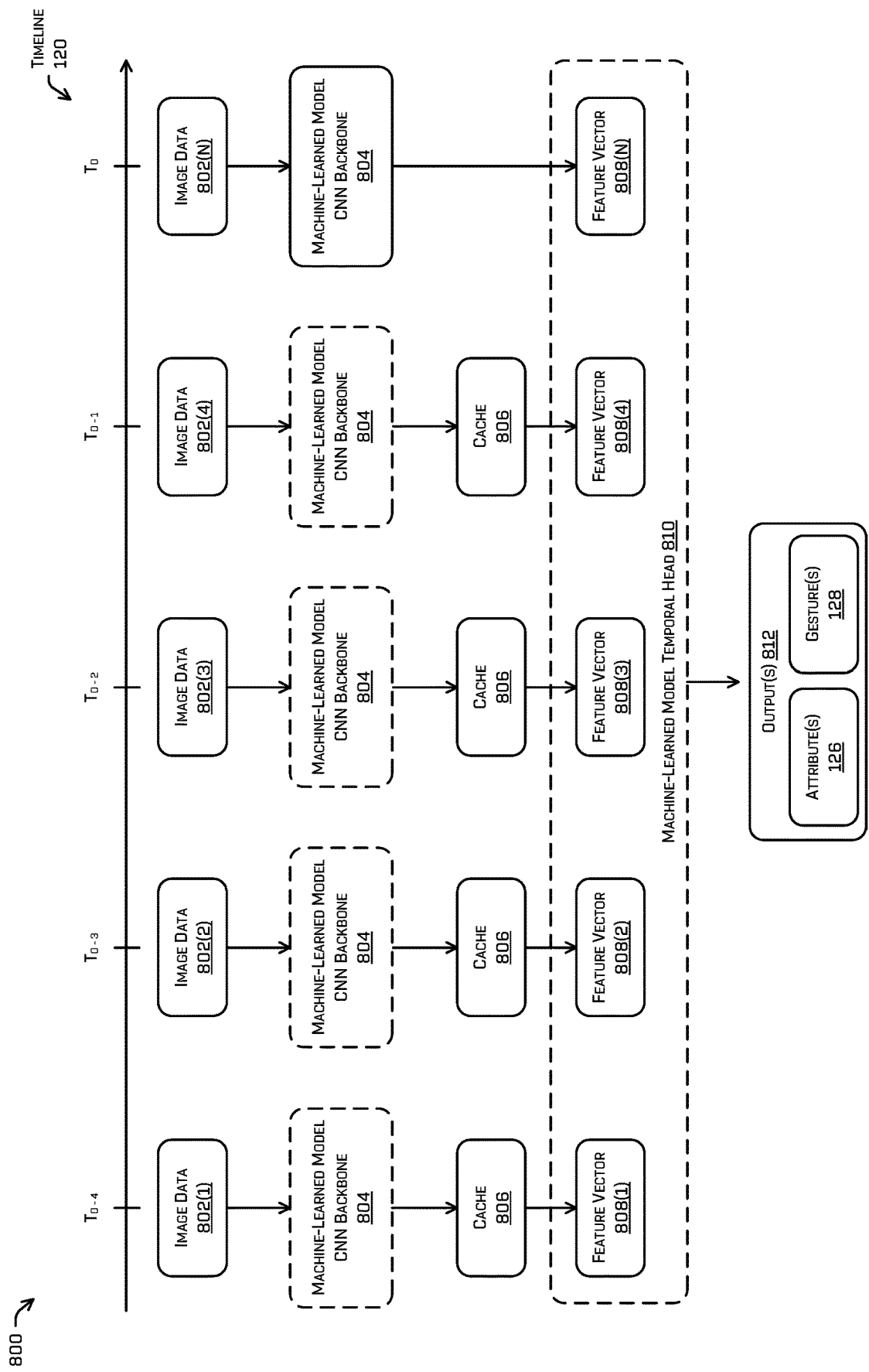
FIG. 8 is a data flow diagram illustrating an example sequence in which image data is input into a machine-learned model to determine one or more output(s) including attribute(s) and/or gesture(s).

FIG. 8 is a data flow diagram illustrating an example sequence 800 in which image data 802(1)-802(N) (hereinafter referred to collectively as "image data 802") (where N represents any number greater than or equal to one) may be input into a machine-learned model to determine one or more output(s) 812 including attribute(s) 126 and/or gesture(s) 128. The image data 802 may have been captured at respective instances of time $T_0$, $T_{0-1}$, $T_{0-2}$, $T_{0-3}$, and $T_{0-4}$ (where $T_0$ represents a present time) of the timeline 120.

At a previous time $T_{0-4}$, the image data 802(1) is input into a machine-learned model convolutional neural network (CNN) backbone 804, and an output from the machine-learned model CNN backbone 804 is temporarily stored in a cache 806. For instance, the output may include the feature vector 808(1), which indicates one or more features detected in the image data 802(1), such as attributes and/or gestures of a pedestrian. Similarly, at the times $T_{0-3}$, $T_{0-2}$, and $T_{0-1}$, the image data 802(2), 802(3), and 802(4) are input into the machine-learned model CNN backbone 804, and respective outputs (e.g., feature vectors 808(2), 808(3), and 808(4)) are temporarily stored in the cache 806 (e.g., for a period of time (e.g., 1 second, 3 seconds, 5 seconds, etc.) and/or a number of images (e.g., 5 images, 6 images, etc.)). In some examples, the CNN backbone 804 may include one or more residual blocks.

At a present time $T_0$, the image data 802(N) is input into the machine-learned model CNN backbone 804. When the machine-learned model CNN backbone 804 outputs the feature vector 808(N), the feature vectors 808(1), 808(2), 808(3), 808(4), and 808(N) may be input into the machine-learned model temporal head 810. In some examples, at a single instance of time T, the machine-learned model CNN backbone 804 operates on a single instance of image data. For instance, at time $T_0$, the machine-learned model CNN backbone 804 may only operate on the image data 802(N) since the output feature vectors 808(1)-808(4) associated with previous instances of image data 802(1)-802(4) are cached.

The machine-learned model temporal head 810 may receive the features vectors 808(1)-808(N) as inputs and generate one or more outputs 812, such as attributes 126 and/or gestures 128. For instance, the machine-learned model temporal head 810 may analyze the feature vectors 808(1), 808(2), 808(3), 808(4), and 808(N) and determine an association between various hand positions of a pedestrian indicated by the feature vectors 808(1), 808(2), 808(3), 808(4), and 808(N) and a gesture, such as a vehicle-go gesture or a pedestrian-go gesture. In other words, the, the machine-learned model temporal head 810 may determine, using the feature vectors 808(1), 808(2), 808(3), 808(4), and 808(N), that a hand position of a pedestrian at the different times $T_0$, $T_{0-1}$, $T_{0-2}$, $T_{0-3}$, and $T_{0-4}$ corresponds with the pedestrian making a vehicle-go gesture or a pedestrian-go gesture. In some examples, the feature vectors 808(1), 808(2), 808(3), 808(4), and 808(N) may be concatenated (or aggregated, combined, etc.) by, or before being input into, the machine-learned model temporal head 810. Additionally, or alternatively, the temporal head 810 may perform one or more convolutions (e.g., temporal convolutions, 3D convolutions, etc.) with respect to the feature vectors 808(1), 808(2), 808(3), 808(4), and 808(N). For instance, in some examples a convolutional neural network may be substituted in place of, or in addition to, the temporal head 810.

Figure 9:
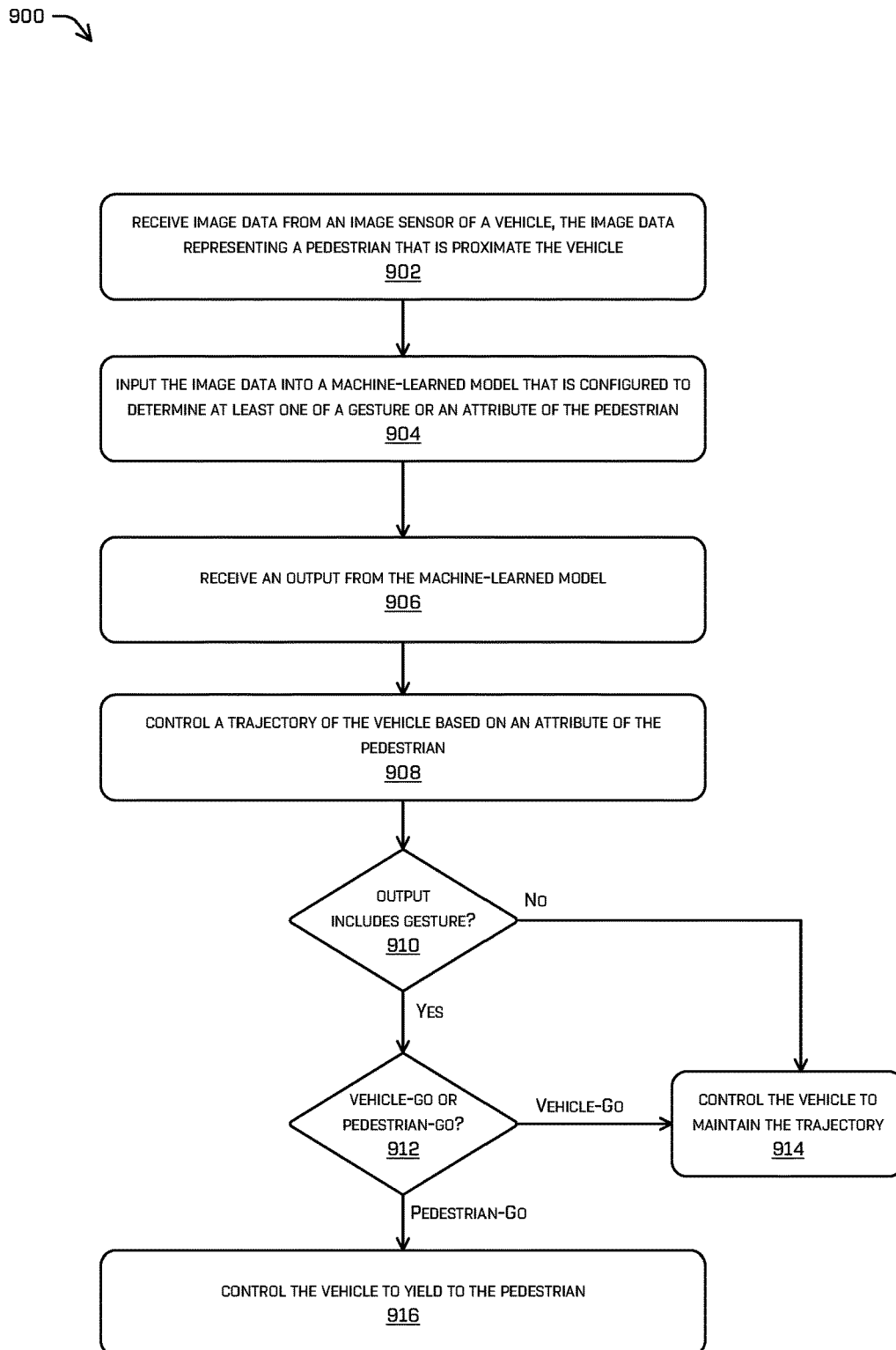
FIG. 9 is a flowchart illustrating an example method that may be performed at least in part by a vehicle computing device to control a vehicle using the pedestrian attribute and gesture detection techniques described herein.
Figure 10:
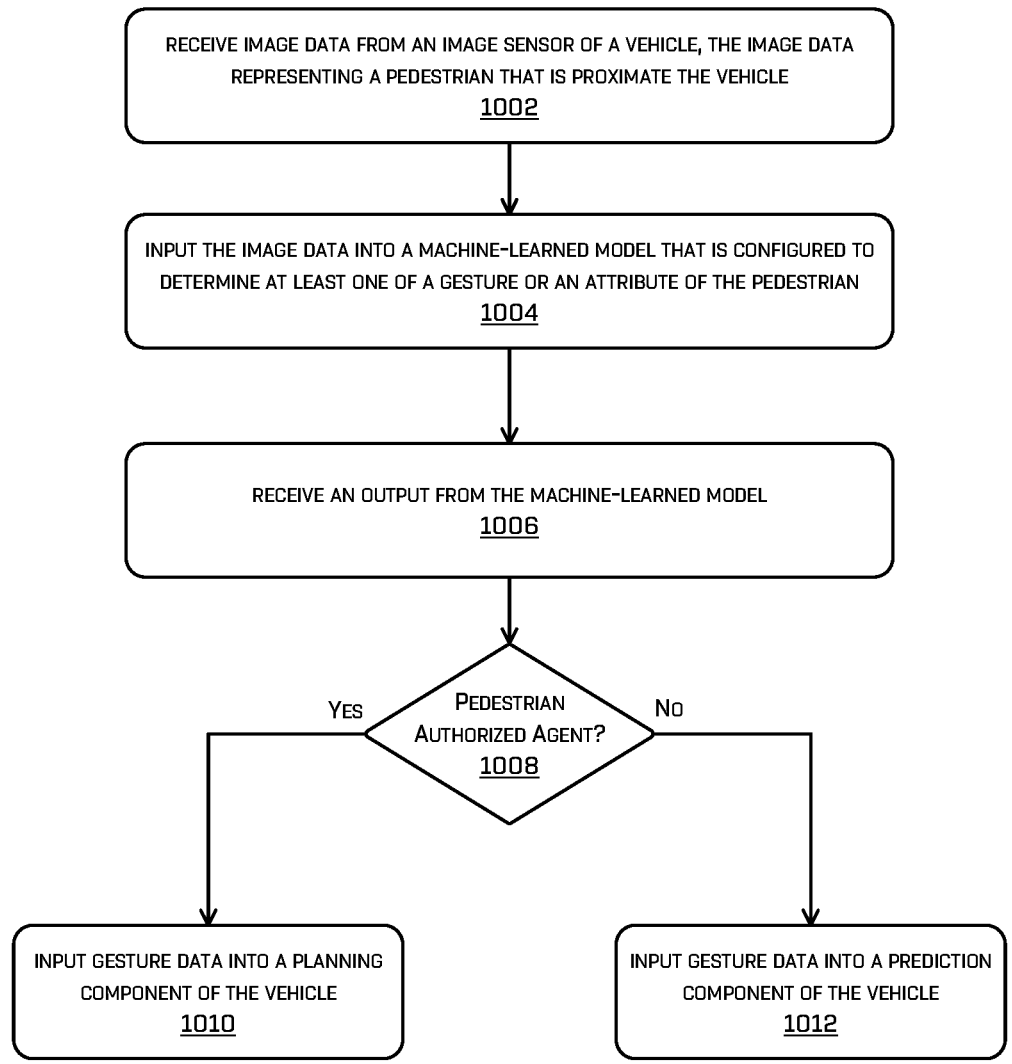
FIG. 10 is a flowchart illustrating another example method that may be performed at least in part by a vehicle computing device to control a vehicle using the pedestrian attribute and gesture detection techniques described herein.

FIGS. 9 and 10 are a flowcharts illustrating example methods 900 and 1000 that may be performed at least in part by a vehicle computing device to control a vehicle using the pedestrian attribute and gesture detection techniques described herein. The methods 900 and 1000 illustrated in FIGS. 9 and 10 are described with reference to one or more of the vehicles and/or systems described in FIGS. 1-8 for convenience and ease of understanding. However, the methods 900 and 1000 illustrated in FIGS. 9 and 10 are not limited to being performed using the vehicles, systems, and/or techniques described in FIGS. 1-8, and may be implemented using any of the other vehicles, systems, and technologies described in this application, as well as vehicles, systems, and technologies other than those described herein. Moreover, the vehicles, systems, and user interfaces described herein are not limited to performing the methods 900 and 1000 illustrated in FIGS. 9 and 10.

The methods 900 and 1000 are illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the methods 900 and 1000 may be combined in whole or in part with each other and with other methods described herein.

The method 900 begins at operation 902, which includes receiving image data from an image sensor of a vehicle, the image data representing a pedestrian that is proximate the vehicle. For instance, the sensor system(s) 206 of the vehicle 202 may capture image data representing a pedestrian 108 that is proximate the vehicle 202. Additionally, the image data may be received by the vehicle computing device(s) 204 of the vehicle 202, the computing device(s) 234, and/or one or more of the components of the vehicle computing device(s) 204, such as the localization component 220, the perception component 222, the planning component 224, or the prediction component 226.

At operation 904, the method 900 includes inputting the image data into a machine-learned model that is configured to determine at least one of a gesture or an attribute of the pedestrian. For instance, the vehicle computing device(s) 204 and/or one or more of the components of the vehicle computing device(s) 204 (e.g., the localization component 220, the perception component 222, the planning component 224, and/or the prediction component 226) may input the image data into the machine-learned model(s) 230. Additionally, or alternatively, the computing device(s) 234 may input the image data into the machine-learned model(s) 244.

At operation 906, the method 900 includes receiving an output from the machine-learned model. For instance, the vehicle computing device(s) 204 and/or one or more of the components of the vehicle computing device(s) 204 (e.g., the localization component 220, the perception component 222, the planning component 224, and/or the prediction component 226) may receive output data 124 from the machine-learned model(s) 230. Additionally, or alternatively, the computing device(s) 234 may receive output data 124 from the machine-learned model(s) 244.

At operation 908, the method 900 includes controlling a trajectory of the vehicle based on an attribute of the pedestrian. For instance, a trajectory of the vehicle 202 may be controlled based on an attribute 126 of the pedestrian 108. In some examples, the planning component 224 and/or the prediction component 226 may control the trajectory of the vehicle 202 based on the attribute 126 of the pedestrian 108. The attribute may indicate, for instance, a pose of the pedestrian, an activity the pedestrian is engaged in, a characteristic of the pedestrian, a classification of the pedestrian, and the like.

At operation 910, the method 900 includes determining whether the output includes an indication of a gesture of the pedestrian, such as the gesture 128 of the pedestrian 108 shown in FIG. 1. If the output does not include a gesture, the method 900 may proceed to operation 914, which is discussed in further detail below. Alternatively, if the output does include a gesture, the method 900 may proceed to operation 912, which includes determining whether the gesture is a vehicle-go gesture or a pedestrian-go gesture.

At operation 912, if it is determined that the gesture is a vehicle-go gesture, then the method 900 may proceed to operation 914, which includes controlling the vehicle to maintain the trajectory. For instance, if the pedestrian 108 is communicating a vehicle-go gesture 128 as shown in FIGS. 1, 3, and 7, for instance, then the vehicle 104 or 202 may maintain its trajectory and refrain from yielding for the pedestrian 108. As an example, if the pedestrian 108 is about to cross a street the vehicle 104 or 202 is traversing, and if the pedestrian 108 is communicating the vehicle-go gesture, then the vehicle may proceed to drive down the street and the pedestrian 108 may cross the street after the vehicle passes by.

Alternatively, if it is determined at operation 912 that the gesture is a pedestrian-go gesture, then the method 900 may proceed to operation 916, which includes controlling the vehicle to yield to the pedestrian. For instance, if the pedestrian 108 is communicating a pedestrian-go gesture 128 as shown in FIGS. 4 and 5B, for instance, then the vehicle 104 or 202 may yield to the pedestrian 108. Continuing the example described in the above paragraph, if the pedestrian 108 is about to cross the street the vehicle 104 or 202 is traversing, and if the pedestrian 108 is communicating the pedestrian-go gesture, then the vehicle may yield to and/or stop for the pedestrian 108 so that the pedestrian 108 may cross the street before the vehicle 104 or 202 passes by.

With respect to FIG. 10, the method 1000 begins at operation 1002, which includes receiving image data from an image sensor of a vehicle, the image data representing a pedestrian that is proximate the vehicle. For instance, the sensor system(s) 206 of the vehicle 202 may capture image data representing a pedestrian 108 that is proximate the vehicle 202. Additionally, the image data may be received by the vehicle computing device(s) 204 of the vehicle 202, the computing device(s) 234, and/or one or more of the components of the vehicle computing device(s) 204, such as the localization component 220, the perception component 222, the planning component 224, or the prediction component 226.

At operation 1004, the method 1000 includes inputting the image data into a machine-learned model that is configured to determine at least one of a gesture or an attribute of the pedestrian. For instance, the vehicle computing device(s) 204 and/or one or more of the components of the vehicle computing device(s) 204 (e.g., the localization component 220, the perception component 222, the planning component 224, and/or the prediction component 226) may input the image data into the machine-learned model(s) 230. Additionally, or alternatively, the computing device(s) 234 may input the image data into the machine-learned model(s) 244.

At operation 1006, the method 1000 includes receiving an output from the machine-learned model. The output may include, in some examples, an indication of an attribute of the pedestrian (e.g., whether the pedestrian is a police officer or other type of authorized agent) and/or a gesture of the pedestrian. For instance, the vehicle computing device(s) 204 and/or one or more of the components of the vehicle computing device(s) 204 (e.g., the localization component 220, the perception component 222, the planning component 224, and/or the prediction component 226) may receive output data 124 from the machine-learned model(s) 230. Additionally, or alternatively, the computing device(s) 234 may receive output data 124 from the machine-learned model(s) 244.

At operation 1008, the method 1000 includes determining whether the pedestrian is an authorized agent. For instance, the output from the machine-learned model may indicate whether the pedestrian is an authorized agent or a civilian pedestrian. If the pedestrian is an authorized agent, the method 1000 proceeds to operation 1010, which includes inputting gesture data into a planning component of the vehicle. Alternatively, if the pedestrian is not identified as an authorized agent, the method 1000 may proceed to operation 1012, which includes inputting the gesture data into a prediction component of the vehicle.

EXAMPLE CLAUSES

A. A system comprising: one or more processors; and one or more non-transitory computer-readable media storing instructions that, when executed by the one or more processors, cause the system to perform operations comprising: receiving first image data from an image sensor associated with a vehicle, the first image data representing a pedestrian that is proximate the vehicle at a first time: receiving second image data from the image sensor, the second image data representing the pedestrian at a second time after the first time: inputting the first image data and the second image data into a machine-learned model: receiving an output, from the machine-learned model, the output indicating a gesture of the pedestrian; and at least one of: inputting an indication of the gesture into a prediction component of the vehicle that is configured to control the vehicle based at least in part on the output: or inputting the indication of the gesture into a planning component of the vehicle based at least in part on the output further indicating that the pedestrian is an authorized agent, the planning component being configured to control the vehicle based at least in part on the output.

B. The system of paragraph A, wherein the gesture of the pedestrian is associated with a hand signal that the vehicle is to either stop for the pedestrian or proceed along a trajectory in which the vehicle is following, the operations further comprising causing the vehicle to either stop or proceed along the trajectory.

C. The system of any one of paragraphs A or B, the operations further comprising: cropping the first image data based at least in part on a bounding box associated with the pedestrian such that the first image data comprises cropped first image data: cropping the second image data based at least in part on the bounding box associated with the pedestrian such that the second image data comprises cropped second image data; and wherein inputting the first image data and the second image data into the machine-learned model comprises inputting the cropped first image data and the cropped second image data into the machine-learned model.

D. The system of any one of paragraphs A-C, wherein the machine-learned model is configured to detect the gesture of the pedestrian based at least in part on a difference between a feature determined in the first image data by a backbone of the machine-learned model and the feature determined in the second image data by the backbone of the machine-learned model.

E. A method comprising: receiving sensor data associated with a pedestrian in an environment of a vehicle: inputting the sensor data into a machine-learned model; receiving, from the machine-learned model, an output indicating a gesture of the pedestrian, the gesture indicative of an action of the pedestrian or the vehicle; and controlling the vehicle based at least in part on the gesture of the pedestrian.

F. The method of paragraph E, wherein: the gesture of the pedestrian is a hand signal indicating that the vehicle is to yield to the pedestrian, and controlling the vehicle comprises causing the vehicle to yield to the pedestrian.

G. The method of any one of paragraphs E or F, wherein: the sensor data is captured by a sensor of the vehicle while the vehicle traverses the environment based at least in part on a trajectory, and the gesture of the pedestrian is a hand signal indicating that the vehicle is to proceed along the trajectory prior to the pedestrian crossing the trajectory.

H. The method of any one of paragraphs E-G, wherein the sensor data is first sensor data captured by the vehicle at a first time, the method further comprising: receiving second sensor data captured by the vehicle at a second time after the first time, the second sensor data associated with the pedestrian; and inputting the second sensor data into the machine-learned model, wherein the output indicating the gesture of the pedestrian is determined by the machine-learned model based at least in part on the first sensor data and the second sensor data.

I. The method of any one of paragraphs E-H, wherein the sensor data comprises at least one of image data, lidar data, radar data, or key point data associated with the pedestrian.

J. The method of any one of paragraphs E-I, wherein: the machine-learned model is further configured to determine an attribute associated with the pedestrian, and the output received from the machine-learned model further indicates the attribute associated with the pedestrian.

K. The method of any one of paragraphs E-J, wherein the attribute associated with the pedestrian comprises at least one of a classification of the pedestrian, a pose of the pedestrian, or an activity of the pedestrian.

L. The method of any one of paragraphs E-K, wherein controlling the vehicle is further based at least in part on the attribute associated with the pedestrian.

M. The method of any one of paragraphs E-L, wherein: the output received from the machine-learned model further includes an indication of a traffic sign held by the pedestrian, the traffic sign indicating a traffic rule associated with a path the vehicle is following through the environment, and controlling the vehicle is further based at least in part on the traffic sign.

N. The method of any one of paragraphs E-M, wherein: the output received from the machine-learned model further indicates that the pedestrian is an authorized agent, and controlling the vehicle is further based at least in part on inputting the output into a planning component of the vehicle.

O. One or more non-transitory computer-readable media storing computer-executable instructions that, when executed, cause one or more processors to perform operations comprising: receiving sensor data associated with a pedestrian in an environment of a vehicle: inputting the sensor data into a machine-learned model; receiving, from the machine-learned model, an output indicating a gesture of the pedestrian, the gesture indicative of an action of the pedestrian or the vehicle; and controlling the vehicle based at least in part on the gesture of the pedestrian.

P. The one or more non-transitory computer-readable media of paragraph O, wherein: the gesture of the pedestrian is a hand signal indicating that the vehicle is to yield to the pedestrian, and controlling the vehicle comprises causing the vehicle to yield to the pedestrian.

Q. The one or more non-transitory computer-readable media of any one of paragraphs O or P, wherein: the sensor data is captured by a sensor of the vehicle while the vehicle traverses the environment based at least in part on a trajectory, and the gesture of the pedestrian is a hand signal indicating that the vehicle is to proceed along the trajectory prior to the pedestrian crossing the trajectory.

R. The one or more non-transitory computer-readable media of any one of paragraphs O-Q, wherein: the output received from the machine-learned model further includes an indication of a traffic sign held by the pedestrian, the traffic sign indicating a traffic rule associated with a path the vehicle is following through the environment, and controlling the vehicle is further based at least in part on the traffic sign.

S. The one or more non-transitory computer-readable media of any one of paragraphs O-R, wherein the output received from the machine-learned model further indicates that the pedestrian is an authorized agent, the operations further comprising inputting the output into a planning component of the vehicle based at least in part on the pedestrian being the authorized agent.

T. The one or more non-transitory computer-readable media of any one of paragraphs O-S, the operations further comprising inputting the output into a prediction component of the vehicle based at least in part on the output indicating that the pedestrian is not an authorized agent.

U. A system comprising: one or more processors; and one or more non-transitory computer-readable media storing instructions that, when executed by the one or more processors, cause the system to perform operations comprising: receiving first image data captured by an image sensor associated with a vehicle, the first image data representing a pedestrian that is proximate the vehicle at a first time: receiving second image data captured by the image sensor, the second image data representing the pedestrian at a second time after the first time: receiving a first indication of a gesture of the pedestrian, the gesture determined based at least in part on the first image data and the second image data: receiving a second indication of an attribute associated with the pedestrian, the attribute determined based at least in part on the first image data or the second image data: inputting the first image data and the second image data into a machine-learned model: receiving, from the machine-learned model, an output indicating a predicted gesture of the pedestrian and a predicted attribute associated with the pedestrian: determining a first difference between the gesture and the predicted gesture: determining a second difference between the attribute and the predicted attribute; and altering a parameter of the machine-learned model to minimize at least one of the first difference or the second difference to obtain a trained machine-learned model that is configured to determine the gesture of the pedestrian and the attribute associated with the pedestrian.

V. The system of paragraph U, wherein the gesture of the pedestrian is a hand signal indicating that the vehicle is to yield to the pedestrian while the pedestrian crosses a trajectory that is to be followed by the vehicle.

W. The system of any one of paragraphs U or V, wherein the gesture of the pedestrian is a hand signal indicating that the vehicle is to proceed along a trajectory followed by the vehicle prior to the pedestrian crossing the trajectory.

X. The system of any one of paragraphs U-W, wherein the attribute associated with the pedestrian comprises at least one of a classification of the pedestrian, a pose of the pedestrian, or an action of the pedestrian.

Y. The system of any one of paragraphs U-X, the operations further comprising: inputting the first image data and the second image data into the trained machine-learned model: receiving an output from the trained machine-learned model, the output indicating the gesture of the pedestrian and the attribute associated with the pedestrian; and controlling the vehicle based at least in part on the gesture of the pedestrian and the attribute associated with the pedestrian.

Z. A method comprising: receiving sensor data associated with a pedestrian in an environment of a vehicle: receiving an indication of a gesture of the pedestrian, the gesture indicative of an action of the pedestrian or of the vehicle: inputting the sensor data into a machine-learned model: receiving an output from the machine-learned model, the output indicating a predicted gesture of the pedestrian: determining a difference between the gesture and the predicted gesture; and altering a parameter of the machine-learned model to minimize the difference to obtain a trained machine-learned model that is configured to determine the gesture of the pedestrian.

AA. The method of paragraph Z, wherein the gesture is a hand signal that is indicative of the action of the pedestrian or of the vehicle.

BB. The method of any one of paragraphs Z or AA, further comprising: determining a classification of the pedestrian based at least in part on the sensor data, the classification representing whether the pedestrian is a civilian pedestrian or an authorized agent; and wherein the output received from the machine-learned model further indicates a predicted classification of the pedestrian.

CC. The method of any one of paragraphs Z-BB, further comprising: receiving location data associated with a current location of the vehicle: inputting the location data into the machine-learned model substantially simultaneously with the sensor data; and wherein the machine-learned model is configured to determine the predicted classification of the pedestrian based at least in part on the location data.

DD. The method of any one of paragraphs Z-CC, wherein the sensor data comprises one or more of image data, lidar data, radar data, or key point data associated with the pedestrian.

EE. The method of any one of paragraphs Z-DD, further comprising: determining that the pedestrian is holding a traffic sign based at least in part on the sensor data, the traffic sign indicative of a traffic rule; and wherein the output received from the machine-learned model further indicates a predicted traffic sign held by the pedestrian and a predicted traffic rule indicated by the predicted traffic sign.

FF. The method of any one of paragraphs Z-EE, further comprising determining an orientation of the traffic sign based at least in part on the sensor data, the orientation of the traffic sign indicative of whether the traffic rule applies to a path the vehicle is following through the environment; and wherein the output received from the machine-learned model further indicates a predicted orientation of the predicted traffic sign.

GG. The method of any one of paragraphs Z-FF, wherein: the sensor data includes first sensor data associated with the pedestrian at a first time and second sensor data associated with the pedestrian at a second time after the first time, and the machine-learned model is configured to determine the output based at least in part on the first sensor data and the second sensor data.

HH. One or more non-transitory computer-readable media storing computer-executable instructions that, when executed, cause one or more processor to perform operations comprising: receiving sensor data associated with a pedestrian in an environment of a vehicle: receiving an indication of a gesture of the pedestrian, the gesture indicative of an action of the pedestrian or of the vehicle: inputting the sensor data into a machine-learned model: receiving an output from the machine-learned model, the output indicating a predicted gesture of the pedestrian: determining a difference between the gesture and the predicted gesture; and altering a parameter of the machine-learned model to minimize the difference to obtain a trained machine-learned model that is configured to determine the gesture of the pedestrian.

II. The one or more non-transitory computer-readable media of paragraph HH, wherein the gesture is a hand signal that is indicative of the action of the pedestrian or of the vehicle.

JJ. The one or more non-transitory computer-readable media of any one of paragraphs HH or II, the operations further comprising: determining a classification of the pedestrian based at least in part on the sensor data, the classification representing whether the pedestrian is a civilian pedestrian or an authorized agent; and wherein the output received from the machine-learned model further indicates a predicted classification of the pedestrian.

KK. The one or more non-transitory computer-readable media of any one of paragraphs HH-JJ, the operations further comprising: receiving location data associated with a current location of the vehicle: inputting the location data into the machine-learned model substantially simultaneously with the sensor data; and wherein the machine-learned model is configured to determine the predicted classification of the pedestrian based at least in part on the location data.

LL. The one or more non-transitory computer-readable media of any one of paragraphs HH-KK, wherein the sensor data comprises one or more of image data, lidar data, radar data, or key point data associated with the pedestrian.

MM. The one or more non-transitory computer-readable media of any one of paragraphs HH-LL, the operations further comprising: determining that the pedestrian is holding a traffic sign based at least in part on the sensor data, the traffic sign indicative of a traffic rule; and wherein the output received from the machine-learned model further indicates a predicted traffic sign held by the pedestrian and a predicted traffic rule indicated by the predicted traffic sign.

NN. The one or more non-transitory computer-readable media of any one of paragraphs HH-MM, wherein: the sensor data includes first sensor data associated with the pedestrian at a first time and second sensor data associated with the pedestrian at a second time after the first time, and the machine-learned model is configured to determine the output based at least in part on the first sensor data and the second sensor data.

While the example clauses described above are described with respect to one particular implementation, it should be understood that, in the context of this document, the content of the example clauses may also be implemented via a method, device, system, computer-readable medium, and/or another implementation. Additionally, any of examples A-NN may be implemented alone or in combination with any other one or more of the examples A-NN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions that, when executed by the one or more processors, cause the system to perform operations comprising:
   receiving first image data from an image sensor associated with a vehicle, the first image data representing a pedestrian that is proximate the vehicle at a first time;
   receiving second image data from the image sensor, the second image data representing the pedestrian at a second time after the first time;
   inputting the first image data and the second image data into a machine-learned model;
   receiving a first output, from the machine-learned model, the first output comprising an indication of a gesture of the pedestrian and a status of the pedestrian, wherein the status comprises an indication of an authorized agent status of the pedestrian;
   based at least in part on the status of the pedestrian, at least one of:
      inputting the first output of the gesture into a prediction component of the vehicle that is configured to generate a prediction based at least in part on the first output; or
      inputting the first output into a planning component of the vehicle based at least in part on the first output further indicating that the pedestrian is an authorized agent, the planning component being configured to determine vehicle trajectories based at least in part on the first output; and
   controlling the vehicle to follow a trajectory to traverse an environment based at least in part on a second output from at least one of the prediction component or the planning component.

2. The system of claim 1, wherein the gesture of the pedestrian is associated with a hand signal that the vehicle is to either stop for the pedestrian or proceed along a trajectory in which the vehicle is following, the operations further comprising causing the vehicle to either stop or proceed along the trajectory.

3. The system of claim 1, the operations further comprising:
   cropping the first image data based at least in part on a bounding box associated with the pedestrian such that the first image data comprises cropped first image data;
   cropping the second image data based at least in part on the bounding box associated with the pedestrian such that the second image data comprises cropped second image data; and
   wherein inputting the first image data and the second image data into the machine-learned model comprises inputting the cropped first image data and the cropped second image data into the machine-learned model.

4. The system of claim 1, wherein the machine-learned model is configured to detect the gesture of the pedestrian based at least in part on a difference between a feature determined in the first image data by a backbone of the machine-learned model and the feature determined in the second image data by the backbone of the machine-learned model.

5. The system of claim 1, wherein the first image data and the second image data are input as a single input into the machine-learned model and wherein the machine-learned model is trained to output the first output based at least in part on the input of the first image data and the second image data as the single input.

6. The system of claim 1, wherein the planning component is further configured to determine vehicle trajectories based at least in part on predictions from the prediction component; and the instructions cause the system to perform further operations comprising inputting, based at least in part on the first output classifying the gesture as an instruction from an authorized agent, the indication of the gesture of the pedestrian into the planning component instead of the prediction component.

7. The system of claim 1, wherein the operations further comprise associating the gesture with a predicted intent of the pedestrian to indicate at least one of pedestrian activity, environment activity, or vehicle activity.

8. A method comprising:
receiving sensor data associated with a pedestrian in an environment of a vehicle;
inputting the sensor data into a machine-learned model;
receiving, from the machine-learned model, an output comprising an indication of a gesture of the pedestrian and a status of the pedestrian, wherein the status comprises an indication of an authorized agent status of the pedestrian;
inputting the output into a prediction component of the vehicle that is configured to generate a prediction of an activity of the pedestrian; and
controlling the vehicle to follow a trajectory through the environment based at least in part on the gesture of the pedestrian and the status of the pedestrian.

9. The method of claim 8, wherein:
the gesture of the pedestrian is a hand signal indicating that the vehicle is to yield to the pedestrian, and
controlling the vehicle comprises causing the vehicle to yield to the pedestrian.

10. The method of claim 8, wherein:
the sensor data is captured by a sensor of the vehicle while the vehicle traverses the environment based at least in part on a trajectory, and
the gesture of the pedestrian is a hand signal indicating that the vehicle is to proceed along the trajectory prior to the pedestrian crossing the trajectory.

11. The method of claim 8, wherein the sensor data is first sensor data captured by the vehicle at a first time, the method further comprising:
receiving second sensor data captured by the vehicle at a second time after the first time, the second sensor data associated with the pedestrian; and
inputting the second sensor data into the machine-learned model, wherein the output indicating the gesture of the pedestrian is determined by the machine-learned model based at least in part on the first sensor data and the second sensor data.

12. The method of claim 8, wherein the sensor data comprises at least one of image data, lidar data, radar data, or key point data associated with the pedestrian.

13. The method of claim 8, wherein:
the machine-learned model is further configured to determine an attribute associated with the pedestrian, and
the output received from the machine-learned model further indicates the attribute associated with the pedestrian.

14. The method of claim 13, wherein the attribute associated with the pedestrian comprises at least one of a classification of the pedestrian, a pose of the pedestrian, or an activity of the pedestrian.

15. The method of claim 8, wherein:
the output received from the machine-learned model further includes an indication of a traffic sign held by the pedestrian, the traffic sign indicating a traffic rule associated with a path the vehicle is following through the environment, and
controlling the vehicle is further based at least in part on the traffic sign.

16. One or more non-transitory computer-readable media storing computer-executable instructions that, when executed, cause one or more processors to perform operations comprising:
receiving sensor data associated with a pedestrian in an environment of a vehicle;
inputting the sensor data into a machine-learned model;
receiving, from the machine-learned model, an output comprising an indication of a gesture of the pedestrian and a status of the pedestrian, wherein the status comprises an indication of the pedestrian being an authorized agent and the gesture is indicative of an action of the pedestrian or the vehicle;
inputting the output into a prediction component of the vehicle configured to generate a prediction of an activity of the pedestrian based at least in part on the output; and
controlling the vehicle to follow a trajectory through the environment based at least in part on the gesture of the pedestrian and the status of the pedestrian.

17. The one or more non-transitory computer-readable media of claim 16, wherein:
the gesture of the pedestrian is a hand signal indicating that the vehicle is to yield to the pedestrian, and
controlling the vehicle comprises causing the vehicle to yield to the pedestrian.

18. The one or more non-transitory computer-readable media of claim 16, wherein:
the sensor data is captured by a sensor of the vehicle while the vehicle traverses the environment based at least in part on a trajectory, and
the gesture of the pedestrian is a hand signal indicating that the vehicle is to proceed along the trajectory prior to the pedestrian crossing the trajectory.

19. The one or more non-transitory computer-readable media of claim 16, wherein:
the output received from the machine-learned model further includes an indication of a traffic sign held by the pedestrian, the traffic sign indicating a traffic rule associated with a path the vehicle is following through the environment, and
controlling the vehicle is further based at least in part on the traffic sign.

20. The one or more non-transitory computer-readable media of claim 16, the operations further comprising inputting the output into a planning component of the vehicle based at least in part on the pedestrian being the authorized agent.

* * * * *